US012530020B2

(12) United States Patent
Anthony et al.

(10) Patent No.: US 12,530,020 B2
(45) Date of Patent: Jan. 20, 2026

(54) DEPLOYING CONTAINERS TO ADJUST INDUSTRIAL DEVICE OPERATIONS BASED ON EVENT DATA CONTEXTUALIZED WITH RESPECT TO HIERARCHICAL DATASETS OF AN INDUSTRIAL AUTOMATION SYSTEM

(71) Applicant: Rockwell Automation Technologies, Inc., Mayfield Heights, OH (US)

(72) Inventors: Michael J Anthony, Milwaukee, WI (US); Christopher W. Como, Chagrin Falls, OH (US); Jonathan A. Mills, Mayfield Heights, OH (US); Keith D. Carter, Locust, NC (US); Todd A. Wiese, Hubertus, WI (US); Jon P. Vanderpas, Appleton, WI (US); Karol Szczupakowski, Katowice (PL); Katherine Sokolnicki, Chelmsford, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 362 days.

(21) Appl. No.: 18/223,942

(22) Filed: Jul. 19, 2023

(65) Prior Publication Data
US 2025/0028303 A1 Jan. 23, 2025

(51) Int. Cl.
*G05B 19/418* (2006.01)
(52) U.S. Cl.
CPC ..... *G05B 19/4184* (2013.01); *G05B 19/4183* (2013.01)
(58) Field of Classification Search
None
See application file for complete search history.

(56) References Cited

U.S. PATENT DOCUMENTS 10,225,335 B2 * 3/2019 Fu .................. G06F 9/5072
10,715,388 B2 7/2020 Fildebrandt et al.
(Continued)

FOREIGN PATENT DOCUMENTS

KR 20200027783 A 3/2020
WO 2020184362 A1 9/2020

OTHER PUBLICATIONS

Extended European Search Report for European Patent Application No. 21179775.8, dated Nov. 25, 2021, 9 pages.
Partial European Search Report for European Patent Application No. 21180068.5, dated Dec. 8, 2021, 17 pages.
Marshall, "Industry 4.0: The PLC evolves from Controller to Cloud Interface," Feb. 9, 2018, https://www.rs-online.com/designspark/evolution-of-the-industrial-plcfrom-controller-to-cloud-interface , retrieved on Nov. 29, 2021, pp. 1-6.
European Search Report for European Patent Application No. 21180068.5, dated Mar. 28, 2022,19 Pages.
(Continued)

*Primary Examiner* — Carlos R Ortiz Rodriguez
(74) *Attorney, Agent, or Firm* — Fletcher Yoder, P.C.

(57) ABSTRACT

Systems and methods described herein may relate to a system including a plurality of industrial devices that each perform one or more operations within an industrial automation system having a plurality of hierarchical levels. Each of the plurality industrial devices may include a compute surface able to perform software tasks. The system may include a system of processors that receives trigger event data from a device corresponding to a first hierarchical level of the plurality of hierarchical levels. In addition, the system of processors is configured to identify a target device associated with additional data associated with the trigger event data, deploy a container to the target device, generate a data pattern based on the trigger event data and the acquired additional data, determine a remedial action associated with the trigger event data based on the data pattern, and instruct a device to implement the remedial action.

20 Claims, 6 Drawing Sheets

(56) References Cited

U.S. PATENT DOCUMENTS

| | | |
|---|---|---|
| 11,182,206 B2 | 11/2021 | Jung et al. |
| 11,474,873 B2 | 10/2022 | Biernat et al. |
| 11,513,877 B2 | 11/2022 | Biernat et al. |
| 2018/0024537 A1 | 1/2018 | Chauvet et al. |
| 2018/0054469 A1 | 2/2018 | Simoncelli |
| 2019/0377604 A1 | 12/2019 | Cybulski |
| 2020/0136906 A1 | 4/2020 | Bernat et al. |
| 2020/0249928 A1 | 8/2020 | Zeng et al. |
| 2020/0278892 A1 | 9/2020 | Nainar et al. |
| 2020/0311617 A1 | 10/2020 | Swan et al. |
| 2021/0089354 A1 | 3/2021 | Nixon et al. |
| 2021/0200814 A1 | 7/2021 | Tal et al. |
| 2021/0218617 A1 | 7/2021 | Palavalli et al. |
| 2021/0382727 A1 | 12/2021 | Vigil et al. |
| 2022/0027721 A1 | 1/2022 | Thoemmes et al. |
| 2022/0091572 A1 | 3/2022 | Biernat et al. |

OTHER PUBLICATIONS

Anonymous, "Pull an Image from a Private Registry", Kubernetes, retrieved on Mar. 18, 2022, 5 Pages, https://web.archive.org/web/20171003051312/https://kubernetes.io/docs/tasks/configure-pod-container/pull-image-private-registry/.

European Search Report for European Patent Application No. 21180279.8, dated Apr. 19, 2022, 12 Pages.

D. Elliott, C. Otero, M. Ridley and X. Merino, "A Cloud-Agnostic Container Orchestrator for Improving Interoperability," 2018 IEEE 11th International Conference on Cloud Computing (CLOUD), 2018, pp. 958-961, doi: 10.1109/CLOUD.2018.00145. (Year: 2018).

A. Khan, "Key Characteristics of a Container Orchestration Platform to Enable a Modern Application," in IEEE Cloud Computing, vol. 4, No. 5, pp. 42-48, Sep./Oct. 2017, doi: 10.1109/MCC.2017.4250933. (Year: 2017).

\* cited by examiner

DEPLOYING CONTAINERS TO ADJUST INDUSTRIAL DEVICE OPERATIONS BASED ON EVENT DATA CONTEXTUALIZED WITH RESPECT TO HIERARCHICAL DATASETS OF AN INDUSTRIAL AUTOMATION SYSTEM

BACKGROUND

The present disclosure generally relates to systems and methods to implement a container orchestration system in an operational technology (OT) network that includes one or more industrial automation systems. More particularly, embodiments of the present disclosure are related to systems and methods for leveraging container orchestration systems to collect and analyze data from OT devices (e.g., industrial devices).

Industrial automation systems are managed and operated using automation control and monitoring systems (e.g., industrial control systems), particularly in industrial automation environments. Such applications may include controlling a wide range of components, such as valves, electric motors, and so forth, and the collection of data via sensors. Typical industrial control systems may include one or more components, such as programming terminals, automation controllers, input/output (I/O) modules, communication networks, human-machine interface (HMI) terminals, and the like.

Generally, the industrial control systems that operate in the OT environment are used to control OT devices accessible via the OT network. For tasks and/or processes that operate within certain operational parameters, maintaining stable and consistent operations of the industrial devices, such as by responding to detected anomalies (e.g., potential anomalies), identifying appropriate corrective actions, and implementing the corrective actions, may be challenging due to processing power (e.g., data analytics) limitations and communication latencies within the OT environments involved in process of collecting data, analyzing data, detecting anomalies, and identifying the appropriate corrective actions. In particular, communication latencies may exist in communicating the collected data, analyzed data, and corrective actions. Accordingly, improved systems and methods for using containers to collect and analyze data in response to detected anomalies or indications of potential anomalies, as well as to respond with appropriate remedial actions within an OT network are desired.

This section is intended to introduce the reader to aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a system includes a plurality of industrial devices configured to perform one or more operations within an industrial automation system having a plurality of hierarchical levels, wherein each device of the plurality of industrial devices comprises a compute surface configured to perform one or more software tasks. Furthermore, the system includes a system of processors configured to receive trigger event data from at least one device of the plurality of industrial devices, wherein the at least one device corresponds to a first hierarchical level of the plurality of hierarchical levels. In addition, the system of processors is configured to identify a target device of the plurality of industrial devices based on the trigger event data and the plurality of hierarchical levels, wherein the target device is associated with additional data associated with the trigger event data and corresponds to a second hierarchical level of the plurality of hierarchical levels, deploy a container to the target device, wherein the container is configured to cause a target compute surface of the target device to acquire the additional data, generate a data pattern based on the trigger event data and the additional data, determine a remedial action associated with the trigger event data based on the data pattern, and instruct at least one device of the plurality of industrial devices to implement the remedial action.

In another embodiment, a method includes receiving, via a system of processors, trigger event data from at least one device of a plurality of industrial devices configured to perform one or more operations within an industrial automation system having a plurality of hierarchical levels, wherein each device of the plurality of industrial devices comprises a compute surface configured to perform one or more software tasks, and wherein the at least one device corresponds to a first hierarchical level of the plurality of hierarchical levels. Furthermore, the method includes identifying, via the system of processors, a target device of the plurality of industrial devices based on the trigger event data and the plurality of hierarchical levels, wherein the target device is associated with additional data associated with the trigger event data and corresponds to a second hierarchical level of the plurality of hierarchical levels, deploying, via the system of processors, a container to the target device, wherein the container is configured to cause a target compute surface of the target device to acquire the additional data, generating, via the system of processors, a data pattern based on the trigger event data and the additional data, determining, via the system of processors, a remedial action associated with the trigger event data based on the data pattern, and instructing, via the system of processors, at least one device of the plurality of industrial devices to implement the remedial action.

In a further embodiment, a non-transitory, computer-readable medium may store instructions that, when executed by a processor, cause the processor to perform operations. The operations include receiving trigger event data from at least one device of a plurality of industrial devices configured to perform one or more operations within an industrial automation system having a plurality of hierarchical levels, wherein each device of the plurality of industrial devices comprises a compute surface configured to perform one or more software tasks, and wherein the at least one device corresponds to a first hierarchical level of the plurality of hierarchical levels. Furthermore, the operations include identifying a target device of the plurality of industrial devices based on the trigger event data and the plurality of hierarchical levels, wherein the target device is associated with additional data associated with the trigger event data and corresponds to a second hierarchical level of the plutarget device, wherein the container is configured to cause a target compute surface of the target device to acquire the additional data, generating a data pattern based on the trigger event data and the additional data, determining a remedial action associated with the trigger event data based on the data pattern, and instructing at least one device of the plurality of industrial devices to implement the remedial action.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present embodiments will become better understood when the following detailed description is read with reference to the accompanying drawings in which like characters represent like parts throughout the drawings, wherein.

DETAILED DESCRIPTION

Figure 1:
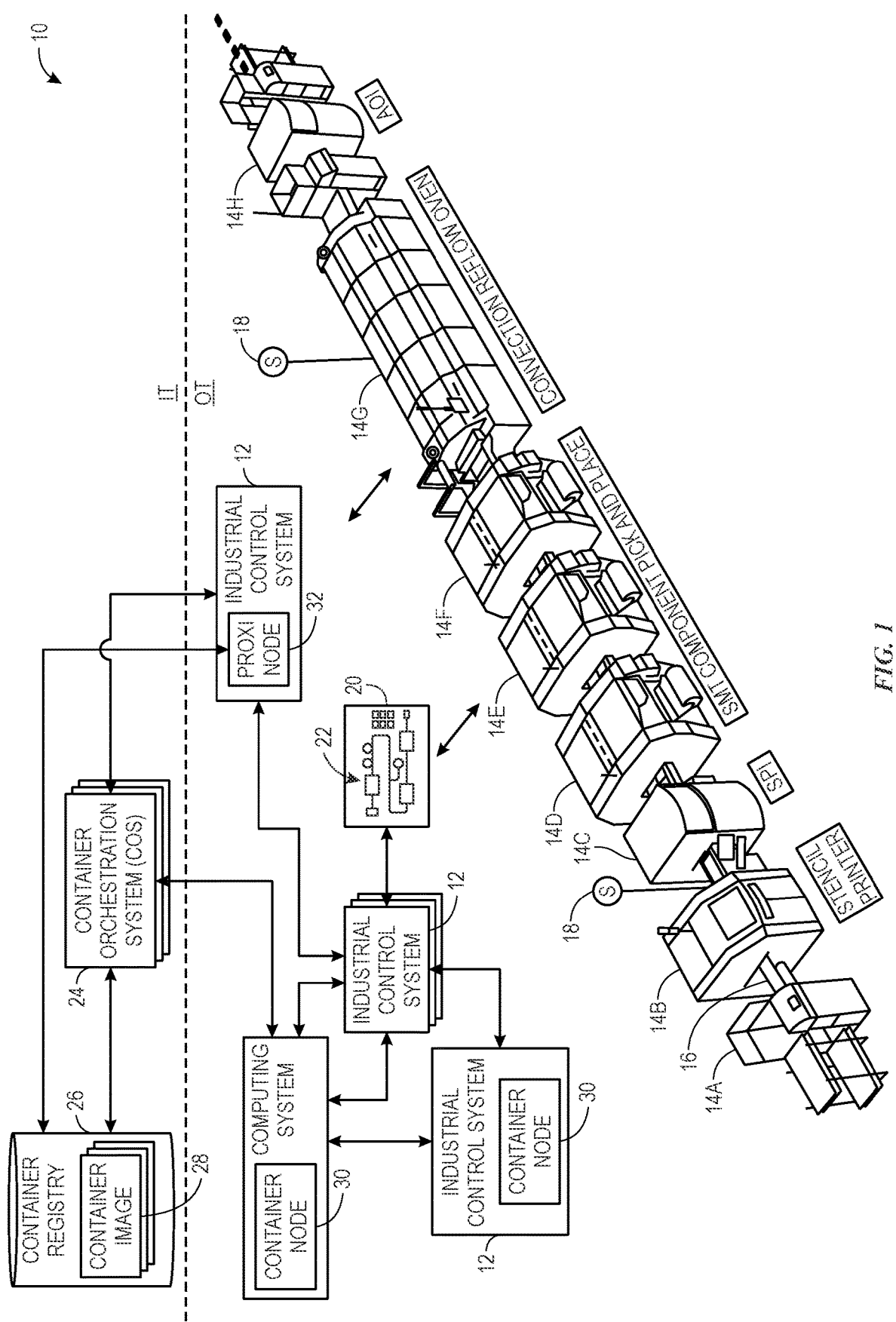
FIG. 1 is a perspective view of an example industrial automation system, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure are generally directed toward industrial automation systems that implement container technologies. Indeed, an industrial automation system may include a container orchestration system in an operational technology (OT) network. The container orchestration system may work in tandem with an informational technology (IT) network and/or industrial control systems to control, monitor, and otherwise manage devices of the industrial automation system. In this way, the container orchestration system may aid collecting and analyzing data from OT devices. Containers include packages of software that may include various elements needed to run in one or more software environments. As a result, containers may be deployed as individual software modules that perform specific operations or functions on the data provided to the respective container. Keeping this in mind, an industrial automation system is made up of many devices disposed in different network layers. Some devices are disposed in lower levels of a hierarchy, while other devices may be disposed on a higher level. Devices at relatively higher hierarchy levels may have the ability to view or access multiple devices on any level lower than and/or equal to its respective level. As such, containers operating on higher level devices may be suited to perform data analysis via data contextualization and/or crowd-sourcing to identify anomalies and/or indications of potential anomalies, and identify appropriate remedial actions associated with the identified anomalies.

With this in mind, a container may correspond to an application. The container, and thus the application, may be deployed to a compute surface within the industrial automation system to perform one or more operations of the application, such as gathering data, analyzing data, executing control commands, or the like. A container may be configurable as a non-perpetual application with a specified start and end condition.

The container orchestration system may organize and control which one or more containers are deployed to which one or more devices and/or specified start and end conditions associated with the deployment. The respective start conditions and/or end conditions may be one or more times, one or more operational triggers, one or more amounts of data, or the like. For example, a container may be deployed at a specific time but then instructed to end after a specified amount of data is collected and/or in response to an industrial automation device state changing (e.g., powering off).

In some embodiments, the container orchestration system may deploy one or more containers in response to a detected anomaly and/or an indication of a potential (e.g., imminent) anomaly, each of which, for example, may be associated with detected data values outside of specified threshold values (e.g., threshold value ranges). The container orchestration system may additionally deploy one or more containers to gather additional data associated with the detected anomaly. In particular, the container orchestrations system may deploy one or more data gathering containers to devices identified as having additional data associated with the anomaly, in response to the detected anomaly and/or the indication of the potential anomaly. The container orchestration system may then receive the additional data and contextualize the anomaly data using additional data to produce contextualized data associated with the anomaly. In some cases, the additional data may be gathered from devices associated with a same hierarchical level as the device containing the anomaly data. Additionally or alternatively, in some embodiments, the additional data may be gathered from devices of a lower hierarchical level as the device containing the anomaly data.

As one example, a container orchestration system may monitor one or more portions of an industrial automation system including an OT device, such as an industrial oven. If the container orchestration system detects an anomaly and/or receives data that is outside of an expected range of values, such as temperature data (e.g., received via a temperature sensor) associated with an inside of the industrial oven being outside of a target temperature data range, the container orchestration system may determine (e.g., identify) one or more additional OT devices within the industrial automation system to acquire additional or supplemental data that may assist a supervisory analysis system, such as an industrial control system, IT-side or cloud-implemented industrial automation monitoring system, or the like, in contextualizing the data. Based on identifying the additional devices, the container orchestration system may deploy one or more data collecting containers to the identified devices, which may have sensors or data acquisition systems able to provide data related to the anomaly. For example, the container orchestration system may deploy one or more data collecting containers to control systems coupled (e.g., communicatively coupled) to ambient temperature and/or humidity sensors. The control systems may contain ambient temperature data and/or ambient humidity data associated with an environment of the industrial oven, and the one or more containers may collect the ambient temperature data and/or ambient humidity data associated with the detected anomaly (e.g., based on a time/time range the anomaly was detected). Contextualizing data associated with a detected anomaly and/or an indication of a potential anomaly may produce more efficient and more precise identification of the anomaly and/or identification, communication, and implementation of an appropriate remedial action associated with the anomaly.

Furthermore, the container orchestration system may determine (e.g., generate) a data pattern (e.g., data signature) based on the contextualized data. The data pattern may include a collection of datasets from various data sources (e.g., devices within same hierarchical level, adjacent hierarchical levels) that corresponds to a time period (e.g., a threshold amount of time before and after detected anomaly) that includes a time in which the anomaly was detected. As such, the data pattern may provide expected datasets from various data sources at various hierarchical levels of the industrial system related to some anomaly.

The container orchestration system may then use the data pattern to identify other devices that may contain a similar data pattern (e.g., have similar contextualized data). In particular, the container orchestration system may utilize one or more containers to crowd-source devices on the same or different hierarchical level as the detected anomaly to identify similar contextualized data and/or data patterns. Specifically, the container orchestration system may deploy the one or more containers to the devices to request data patterns and/or identify data patterns that are substantially similar to the generated contextualized data pattern. As such, the requested data patterns may correspond to coordinated data patterns that provide relational understandings or context that detail the devices that provide the datasets, which may be aggregated into a system or subsystem pattern. Additionally or alternatively, the container orchestration system may determine one or more devices that may contain similar contextualized data and/or data patterns based on a known type (e.g., identification of) and/or known function of one or more devices. The container orchestration system may then deploy the one or more containers to the devices determined to be associated with a similar type (e.g., identification) and/or a similar function as the device of the detected anomaly and/or the devices that are associated with the generated contextualized data pattern. In particular, upon identifying a similar contextualized data pattern and/or a device that may contain a similar contextualized data pattern, the container orchestration system may deploy one or more data analysis containers to the device associated with the similar contextualized data pattern to identify an anomaly (e.g., anomaly type) and/or identify a remedial action associated with the anomaly. In some embodiments, identification of the anomaly and/or the remedial action may be stored in association with the contextualized data pattern in the database, and the container orchestration system may receive an indication of the identification of the anomaly and/or the remedial action from the database.

Returning to the industrial oven example, the container orchestration system may determine that the detected anomaly is associated with the industrial oven and identify a similar device, such as another industrial oven, located within the same industrial control system. The container orchestration system may deploy one or more data analysis containers to a control system associated with the other industrial oven to analyze data received from additional sensors (e.g., internal oven temperature sensors, ambient temperature and/or humidity sensors) associated with the other oven to identify a similar (e.g., correlating) contextualized data pattern. In some embodiments, the container orchestration system may identify the detected anomaly based on the similar contextualized data pattern being within a threshold metric (e.g., threshold value, threshold range) of similarity (e.g., matching) of the generated contextualized data pattern. In other words, the similar contextualized data pattern may include a threshold amount of matching data that corresponds to data of the generated contextualized data pattern. Based on the identification of the anomaly, the container orchestration system may determine and/or identify the appropriate remedial action associated with the detected anomaly. Additionally or alternatively, the container orchestration system may identify the appropriate remedial action based on the similar contextualized data pattern being within a threshold metric (e.g., threshold value, threshold range) of the generated contextualized data pattern, as the similar contextualized data pattern may be associated with an appropriate remedial action.

In some embodiments, data patterns may be stored and/or cataloged via a database, and the container orchestration system may query, via the network, the database based on the generated data pattern and may receive the similar contextualized data and/or data patterns stored in the database. Further, in some embodiments, the container orchestration system may utilize one or more containers to identify similar contextualized data and/or data patterns that may be found at another container orchestration systems and/or another industrial control systems communicatively coupled to the container orchestration system, such as via a network. In particular, the container orchestration system may request the another container orchestration system and/or the another industrial control system to identify devices that may contain similar contextualized data patterns and/or identify similar contextualized data patterns stored in a database accessible by the another container orchestration system and/or the another industrial control system. Upon identifying a similar contextualized data pattern and/or a device that may contain a similar contextualized data pattern, the container orchestration system may deploy and/or instruct the another container orchestration system to deploy one or more data analysis containers to the device associated with the similar contextualized data pattern to identify an anomaly (e.g., anomaly type) and/or identify a remedial action associated with the anomaly. In some embodiments, identification of the anomaly and/or the remedial action may be stored in association with the contextualized data pattern in the database communicatively coupled to the another container orchestration system and/or the another industrial control system, and the container orchestration system may receive an indication of the identification of the anomaly and/or the remedial action from the database, from the another container orchestration system and/or the another industrial control system, via the network.

Furthermore, the container orchestration system may receive the indication of the identified anomaly and/or identified remedial action and deploy additional one or more containers or transmit control instructions to appropriate devices to implement the remedial action associated with the anomaly. As in the industrial oven example, upon identifying and/or receiving an indication of the appropriate remedial action, the container orchestration system may deploy additional one or more containers to the control system associated with operation of the industrial oven to adjust a temperature of the industrial oven. Thus, the container orchestration system may deploy one or more containers to automatically gather and contextualize data associated with an anomaly, identify the anomaly and/or remedial action based on the contextualized data, and implement corrective actions associated with detected anomalies, to rapidly and efficiently respond to the detected anomalies and assist in maintaining stable and consistent operations of the industrial devices.

In some embodiments, the container orchestration system may generate a visualization via a human-machine interface (HMI). The visualization may include a visual indication of a detected anomaly and provide options with regard to locations in which certain containers may be deployed to assist in identification of the anomaly and/or the appropriate remedial action. The visualization may include a list of options for the types of containers that may be useful in identification of the anomaly and/or the appropriate remedial action to resolve the detected anomaly, such as data acquisition containers and/or data analysis container to contextualize the detected anomaly data and generate a data pattern associated with the detected anomaly, and/or a type of deployment of the containers, such as hierarchical deployment and/or indication of another container orchestration system and/or industrial automation system that may contain similar contextualized data patterns. Furthermore, the HMI may enable an operator to manage the deployment of any of the containers. The visualization may also be updated during any point in the process of receiving data indicating a detected anomaly, gathering additional data to contextualize the data associated with the detected anomaly, generating a data pattern associated with the detected anomaly, identifying similar data patterns in other devices, in other container orchestration systems, in other industrial automation systems, and/or in a database, identifying the anomaly and/or identifying an appropriate remedial action, and communicating the remedial action to the devices associated with the anomaly. Additional details are discussed below with reference to FIGS. 1-8.

By way of introduction, FIG. 1 is a perspective view of an example industrial automation system 10 controlled by one or more industrial control systems 12. The industrial automation system 10 includes stations 14 (e.g., stations 14A through 14H) having machine components and/or machines to conduct functions within an automated process, such as silicon wafer manufacturing, as is depicted. The automated process may begin at a station 14A used for loading objects, such as substrates, into the industrial automation system 10 via a conveyor section 16. The conveyor section 16 may transport the objects to a station 14B to perform a first action, such a printing solder paste to the substrate via stenciling. As objects exit from the station 14B, the conveyor section 16 may transport the objects to a station 14C for solder paste inspection (SPI) to inspect printer results, to a station 14D, 14E, and 14F for surface mount technology (SMT) component placement, to a station 14G for convection reflow oven to melt the solder to make electrical couplings, and finally to a station 14H for automated optical inspection (AOI) to inspect the object manufactured (e.g., the manufactured printed circuit board). After the objects proceed through the various stations, the objects may be removed from the station 14H, for example, for storage in a warehouse or for shipment. Clearly, for other applications, the particular system, machine components, machines, stations, and/or conveyors may be different or specially adapted to the application.

For example, the industrial automation system 10 may include machinery to perform various operations in a compressor station, an oil refinery, a batch operation for making food items, chemical processing operations, brewery operations, mining operations, a mechanized assembly line, and so forth. Accordingly, the industrial automation system 10 may include a variety of operational components, such as electric motors, valves, actuators, temperature elements, pressure sensors, or a myriad of machinery or devices used for manufacturing, processing, material handling, and other applications. The industrial automation system 10 may also include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation system 10 may also include motors, protection devices, switchgear, compressors, and the like. Each of these described operational components may correspond to and/or generate a variety of operational technology (OT) data regarding operation, status, sensor data, operational modes, alarm conditions, or the like, that may be desirable to output for analysis with IT data from an IT network, for storage in an IT network, for analysis with expected operation set points (e.g., thresholds), or the like.

In certain embodiments, one or more properties of the industrial automation system 10 equipment, such as the stations 14A through 14H, may be monitored and controlled by the industrial control systems 12 for regulating control variables. For example, sensing devices (e.g., sensors 18) may monitor various properties of the industrial automation system 10 and may be used by the industrial control systems 12 at least in part in adjusting operations of the industrial automation system 10 (e.g., as part of a control loop). In some cases, the industrial automation system 10 may be associated with devices used by other equipment. For instance, scanners, gauges, valves, flow meters, and the like may be disposed on or within the industrial automation system 10. Here, the industrial control systems 12 may receive data from the associated devices and use the data to perform their respective operations more efficiently. For example, a controller of the industrial automation system 10 associated with a motor drive may receive data regarding a temperature of a connected motor and may adjust operations of the motor drive based on the data.

The industrial control systems 12 may be communicatively coupled to a display/operator interface 22 (e.g., a human-machine interface (HMI)) and to devices of the industrial automation system 10. It should be understood that any suitable number of industrial control systems 12 may be used in a particular industrial automation system 10 embodiment. The industrial control systems 12 may facilitate representing components of the industrial automation system 10 through programming objects that may be instantiated and executed to provide simulated functionality similar or identical to the actual components, as well as visualization of the components, or both, on the display/operator interface 22. The programming objects may include code and/or instructions stored in the industrial control systems 12 and executed by processing circuitry of the industrial control systems 12. The processing circuitry may communicate with memory circuitry to permit the storage of the component visualizations.

As illustrated, a display 20 may present a display/operator interface 22 depicting representations of the components of the industrial automation system 10. The industrial control system 12 may use data transmitted by sensors 18 to update visualizations of the components via changing one or more statuses, states, and/or indications of current operations of the components. These sensors 18 may be any suitable device adapted to provide information regarding process conditions. Indeed, the sensors 18 may be used in a process loop (e.g., control loop) that may be monitored and controlled by the industrial control system 12. As such, a process loop may be activated based on process inputs (e.g., an input from the sensor 18) or direct input from a person via the display/operator interface 22. The person operating and/or monitoring the industrial automation system 10 may reference the display/operator interface 22 to determine various statuses, states, and/or current operations of the industrial automation system 10 and/or for a particular component. Furthermore, the person operating and/or monitoring the industrial automation system 10 may adjust to various components to start, stop, power-down, power-on, or otherwise adjust an operation of one or more components of the industrial automation system 10 through interactions with control panels or various input devices.

The industrial automation system 10 may be considered a data-rich environment with several processes and operations that each respectively generate a variety of data. For example, the industrial automation system 10 may be associated with material data (e.g., data corresponding to substrate or raw material properties or characteristics), parametric data (e.g., data corresponding to machine and/or station performance, such as during operation of the industrial automation system 10), test results data (e.g., data corresponding to various quality control tests performed on a final or intermediate product of the industrial automation system 10), or the like, that may be organized and sorted as OT data. In addition, sensors 18 may gather OT data indicative of one or more operations of the industrial automation system 10 or the industrial control system 12. In this way, the OT data may be analog data or digital data indicative of measurements, statuses, alarms, or the like associated with operation of the industrial automation system 10 or the industrial control system 12.

The industrial control systems 12 described above may operate in an OT space in which OT data is used to monitor and control OT assets, such as the equipment illustrated in the stations 14A through 14H of the industrial automation system 10 or other industrial equipment. The OT space, environment, or network generally includes direct monitoring and control operations that are coordinated by the industrial control system 12 and a corresponding OT asset. For example, a programmable logic controller (PLC) may operate in the OT network to control operations of an OT asset (e.g., drive, motor). The industrial control systems 12 may be specifically programmed or configured to communicate directly with the respective OT assets.

A container orchestration system 24, on the other hand, may operate in an information technology (IT) environment. That is, the container orchestration system 24 may include a cluster of multiple computing devices (e.g., IT device) that coordinates an automatic process of managing or scheduling work of individual containers for applications within the computing devices of the cluster. In other words, the container orchestration system may be used to automate various tasks at scale across multiple computing devices. By way of example, the container orchestration system 24 may automate tasks such as configuring and scheduling deployment of containers, provisioning and deploying containers, determining availability of containers, configuring applications in terms of the containers that they run in, scaling of containers to equally balance application workloads across an infrastructure, allocating resources between containers, performing load balancing, traffic routing, and service discovery of containers, performing health monitoring of containers, securing the interactions between containers, and the like. In any case, the container orchestration system 24 may use configuration files to determine a network protocol to facilitate communication between containers, a storage location to save logs, and the like. The container orchestration system 24 may also schedule deployment of containers into clusters and identify a host (e.g., node) that may be best suited for executing the container. After the host is identified, the container orchestration system 24 may manage the lifecycle of the container based on predetermined specifications.

With the foregoing in mind, it should be noted that containers refer to technology for packaging an application along with its runtime dependencies. That is, containers include applications that are decoupled from an underlying host infrastructure (e.g., operating system). By including the run time dependencies with the container, the container may perform in the same manner regardless of the host in which it is operating. In some embodiments, containers may be stored in a container registry 26 as container images 28. The container registry 26 may be any suitable data storage or database that may be accessible to the container orchestration system 24. The container image 28 may correspond to an executable software package that includes the tools and data employed to execute a respective application. That is, the container image 28 may include related code for operating the application, application libraries, system libraries, runtime tools, default values for various settings, and the like.

By way of example, an integrated development environment (IDE) tool may be employed by a user to create a deployment configuration file that specifies a desired state for the collection of nodes of the container orchestration system 24. The deployment configuration file may be stored in the container registry 26 along with the respective container images 28 associated with the deployment configuration file. The deployment configuration file may include a list of different pods and a number of replicas for each pod that should be operating within the container orchestration system 24 at any given time. Each pod may correspond to a logical unit of an application, which may be associated with one or more containers. The container orchestration system 24 may coordinate the distribution and execution of the pods listed in the deployment configuration file, such that the desired state is continuously met. In some embodiments, the container orchestration system 24 may include a controller node that retrieves the deployment configuration files from the container registry 26, schedules the deployment of pods to the connected nodes, and ensures that the desired state specified in the deployment configuration file is met. For instance, if a pod stops operating on one node, the controller node may receive a notification from the respective worker node that is no longer executing the pod and deploy the pod to another worker node to ensure that the desired state is present across the cluster of nodes.

As mentioned above, the container orchestration system 24 may include a cluster of computing devices, computing systems, or container nodes that may work together to achieve certain specifications or states, as designated in the respective container. In some embodiments, container nodes 30 may be integrated within industrial control systems 12 as shown in FIG. 1. That is, container nodes 30 may be implemented by the industrial control systems 12, such that they appear as worker nodes to the controller node in the container orchestration system 24. In this way, the controller node of the container orchestration system 24 may send commands to the container nodes 30 that are also configured to perform applications and operations for the respective industrial equipment.

With this in mind, the container nodes 30 may be integrated with the industrial control systems 12, such that they serve as passive-indirect participants, passive-direct participants, or active participants of the container orchestration system 24. As passive-indirect participants, the container nodes 30 may respond to a subset of all of the commands that may be issued by the container orchestration system 24. In this way, the container nodes 30 may support limited container lifecycle features, such as receiving pods, executing the pods, updating a respective filesystem to included software packages for execution by the industrial control system 12, and reporting the status of the pods to the controller node of the container orchestration system 24. The limited features implementable by the container nodes 30 that operate in the passive-indirect mode may be limited to commands that the respective industrial control system 12 may implement using native commands that map directly to the commands received by the controller node of the container orchestration system 24. Moreover, the container node 30 operating in the passive-indirect mode of operation may not be capable to push the packages or directly control the operation of the industrial control system 12 to execute the package. Instead, the industrial control system 12 may periodically check the file system of the container node 30 and retrieve the new package at that time for execution.

As passive-direct participants, the container nodes 30 may operate as a node that is part of the cluster of nodes for the container orchestration system 24. As such, the container node 30 may support the full container lifecycle features. That is, container node 30 operating in the passive-direct mode may unpack a container image and push the resultant package to the industrial control system 12, such that the industrial control system 12 executes the package in response to receiving it from the container node 30. As such, the container orchestration system 24 may have access to a worker node that may directly implement commands received from the controller node onto the industrial control system 12.

In the active participant mode, the container node 30 may include a computing module or system that hosts an operating system (e.g., Linux) that may continuously operate a container host daemon that may participate in the management of container operations. As such, the active participant container node 30 may perform any operations that the controller node of the container orchestration system 24 may perform. By including a container node 30 operating in the OT space, the container orchestration system 24 is capable of extending its management operations into the OT space. That is, the container node 30 may provision devices in the OT space, serve as a proxy node 32 to provide bi-directional coordination between the IT space and the OT space, and the like. For instance, the container node 30 operating as the proxy node 32 may intercept orchestration commands and cause industrial control system 12 to implement appropriate machine control routines based on the commands. The industrial control system 12 may confirm the machine state to the proxy node 32, which may then reply to the controller node of the container orchestration system 24 on behalf of the industrial control system 12.

Additionally, the industrial control system 12 may share an OT device tree via the proxy node 32. As such, the proxy node 32 may provide the controller node with state data, address data, descriptive metadata, versioning data, certificate data, key information, and other relevant parameters concerning the industrial control system 12. Moreover, the proxy node 32 may issue requests targeted to other industrial control systems 12 to control other OT devices. For instance, the proxy node 32 may translate and forward commands to a target OT device using one or more OT communication protocols, may translate and receive replies from the OT devices, and the like. As such, the proxy node 32 may perform health checks, provide configuration updates, send firmware patches, execute key refreshes, and other OT operations for other OT devices.

Figure 2:
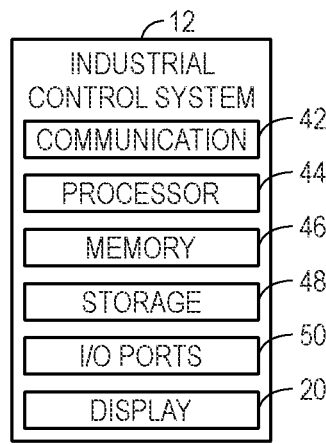
FIG. 2 is a block diagram of an example industrial control system, in accordance with an embodiment.

With the foregoing in mind, FIG. 2 is a block diagram of an example industrial control system 12 that may be used with the embodiments described herein. The industrial control system 12 may include a communication component 42, a processor 44 (e.g., system of processors 44), a memory 46, a storage 48, input/output (I/O) ports 50, a display 20, and the like. The communication component 42 may be a wireless or wired communication component that facilitates communication between the container orchestration system 24 and the industrial control system 12, or any other suitable electronic device. The processor 44 may be any type of computer processor or microprocessor capable of executing computer-executable code. The processor 44 may also include multiple processors that may perform the operations described below.

The memory 46 and the storage 48 may be any suitable article of manufacture that may serve as media to store processor-executable code, data, or the like. These articles of manufacture may represent computer-readable media (i.e., any suitable form of memory or storage) that may store the processor-executable code used by the processor 44 to perform the presently disclosed techniques. The memory 46 and the storage 48 may represent non-transitory computer-readable media (e.g., any suitable form of memory or storage) that may store the processor-executable code used by the processor 44 to perform various techniques described herein. It should be noted that non-transitory merely indicates that the media is tangible and not a signal.

The I/O ports 50 may couple to one or more sensors 18, one or more input devices, one or more displays, or the like to facilitate human or machine interaction with the industrial control system 12. For example, based on a notification provided to a user via a display 20, the user may use an input device to instruct the adjustment of an OT device.

The display 20, as discussed above, may operate to depict visualizations associated with software or executable code being processed by the processor 44. In one embodiment, the display 20 may be a touch display capable of receiving inputs from a user of the industrial control system 12. The display 20 may be any suitable type of display, such as a liquid crystal display (LCD), plasma display, or an organic light emitting diode (OLED) display, for example. Additionally, in one embodiment, the display 20 may be provided in conjunction with a touch-sensitive mechanism (e.g., a touch screen) that may function as part of a control interface for the industrial control system 12.

Although FIG. 2 is depicted with respect to the industrial control system 12, it should be noted that the container orchestration system 24, the container nodes 30, and the proxy node 32 may also include the same or similar components to perform, or facilitate performing, the various techniques described herein. Moreover, it should be understood that the components described with respect to FIG. 2 are exemplary figures and the industrial control system 12 and other suitable computing systems may include additional or fewer components as detailed above.

Figure 3:
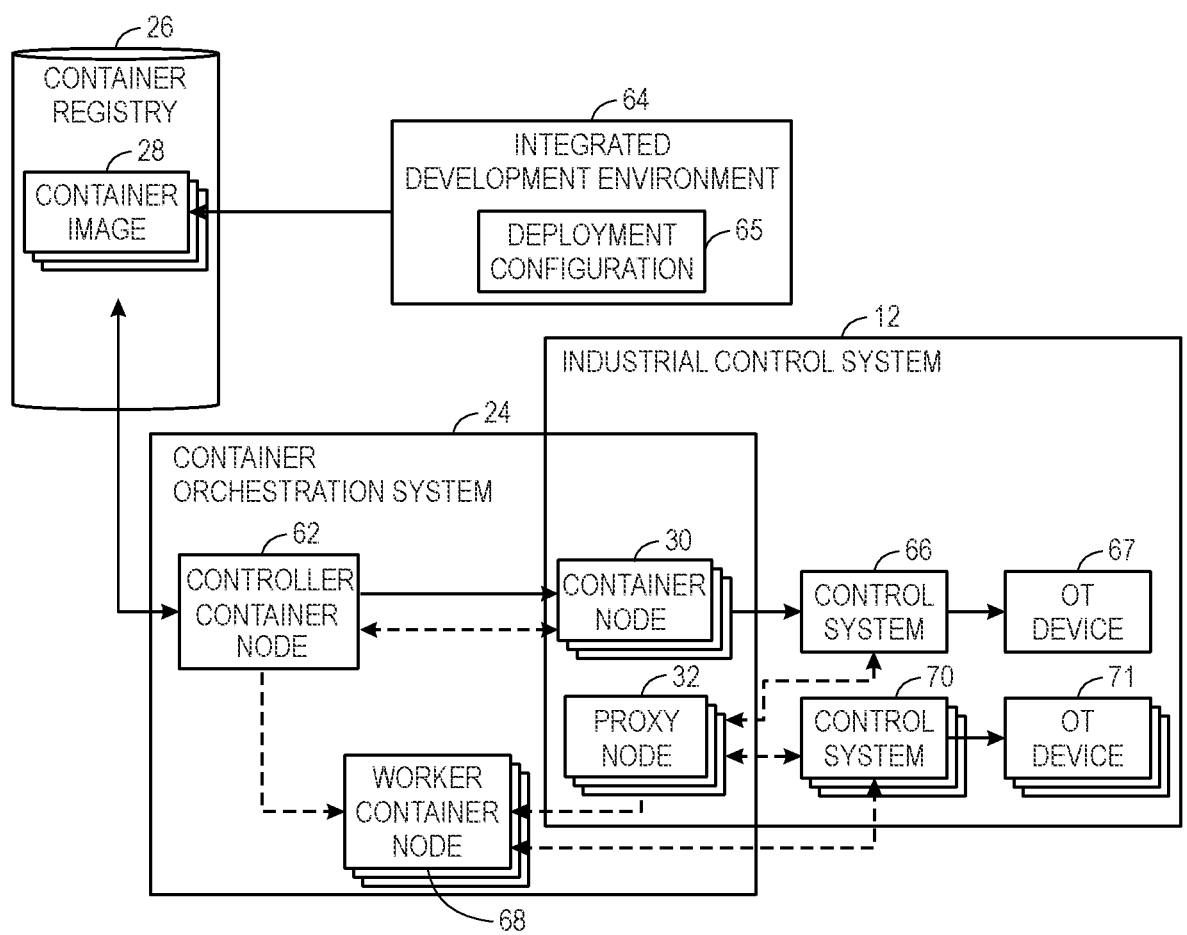
FIG. 3 is a block diagram of an example operational technology (OT) network that coordinates with a container orchestration system, in accordance with an embodiment.

With the foregoing in mind, FIG. 3 illustrates a block diagram that depicts the relative positions of the container node 30 and the proxy node 32 with respect to the container orchestration system 24. As mentioned above, the container orchestration system 24 may include a collection of nodes that are used to achieve a desired state of one or more containers across multiple nodes. As shown in FIG. 3, the container orchestration system 24 may include a controller node 62 that may execute control plane processes for the container orchestration system 24. The control plane processes may include the processes that enable the container orchestration system 24 to coordinate operations of the container nodes 30 to meet the desired states. As such, the controller container node 62 may execute an applications programming interface (API) for the container orchestration system 24, a scheduler component, core resource controllers, and the like. By way of example, the controller container node 62 may coordinate all of the interactions between nodes of the cluster that make up the container orchestration system 24. Indeed, the controller container node 62 may be responsible for deciding the operations that will run on container nodes 30 including scheduling workloads (e.g., containerized applications), managing the workloads' lifecycle, scaling, and upgrades, managing network and storage resources for the workloads, and the like. The controller container node 62 may run an API server to handle requests and status updates received from the container nodes 30.

By way of operation, an integrated development environment (IDE) tool 64 may be used by an operator to develop a deployment configuration file 65. As mentioned above, the deployment configuration file 65 may include details regarding the containers, the pods, constraints for operating the containers/pods, and other information that describe a desired state of the containers specified in the deployment configuration file 65. In some embodiments, the deployment configuration file 65 may be generated in a YAML file, a JSON file, or other suitable file format that is compatible with the container orchestration system 24. After the IDE tool 64 generates the deployment configuration file 65, the IDE tool 64 may transmit the deployment configuration file 65 to the container registry 26, which may store the file along with container images 28 representative of the containers stored in the deployment configuration file 65.

In some embodiments, the controller container node 62 may receive the deployment configuration file 65 via the container registry 26, directly from the IDE tool 64, or the like. The controller container node 62 may use the deployment configuration file 65 to determine a location to gather the container images 28, determine communication protocols to use to establish networking between container nodes 30, determine locations for mounting storage volumes, locations to store logs for the containers, and the like.

Based on the desired state provided in the deployment configuration file 65, the controller container node 62 may deploy containers to the container host nodes 30. That is, the controller container node 62 may schedule the deployment of a container based on constraints (e.g., CPU or memory availability) provided in the deployment configuration file 65. After the containers are operating on the container nodes 30, the controller container node 62 may manage the lifecycle of the containers to ensure that the containers specified by the deployment configuration file 65 is operating according to the specified constraints and the desired state. In some cases, an operating container on the container nodes 30 may pre-process or partially process data and then transmit the pre-processed or partially processed data to an additional compute surface (e.g., another container node 30, another device) with in the industrial automation system 10, such as for example, an edge device or a server for additional processing.

Keeping the foregoing in mind, the industrial control system 12 may not use an operating system (OS) that is compatible with the container orchestration system 24. That is, the container orchestration system 24 may be configured to operate in the IT space that involves the flow of digital information. In contrast, the industrial control system 12 may operate in the OT space that involves managing the operation of physical processes and the machinery used to perform those processes. For example, the OT space may involve communications that are formatted according to OT communication protocols, such as EtherNet/IP and the like. Common Industrial Protocol (CIP), OPC Direct Access (e.g., machine to machine communication protocol for industrial automation developed by the OPC Foundation), OPC Unified Architecture (OPCUA), or any suitable OT communication protocol (e.g. DNP3, Modbus, Profibus, LonWorks, DALI, BACnet, KNX, EnOcean). Because the industrial control systems 12 operate in the OT space, the industrial control systems may not be capable of implementing commands received via the container orchestration system 24.

In certain embodiments, the container node 30 may be programmed or implemented in the industrial control system 12 to serve as a node agent that can register the industrial control system 12 with the controller container node 62. The node agent may or may not be the same as the proxy node 32 shown in FIG. 1. For example, the industrial control system 12 may include a programmable logic controller (PLC) that does not support an operating system (e.g., Linux) for receiving and/or implementing requested operations issued by the container orchestration system 24. However, the PLC may perform certain operations that may be mapped to certain container events. As such, the container node 30 may include software and/or hardware components that may map certain events or commands received from the controller container node 62 into actions that may be performed by the PLC. After converting the received command into a command interpretable by the PLC, the container node 30 may forward the mapped command to the PLC that may implement the mapped command. As such, the container node 30 may operate as part of the cluster of nodes that make up the container orchestration system 24, while a control system 66 (e.g., PLC) that coordinates the OT operations for an OT device 67 in the industrial control system 12. The control system 66 may include a controller, such as a programmable logic controller (PLC), a programmable automation controller (PAC), or any other controller that may monitor, control, and operate an industrial automation device or component.

The industrial automation device or component may correspond to an OT device 67. The OT device 67 may include any suitable industrial device that operates in the OT space. As such, the OT device 67 may be involved in adjusting physical processes being implemented via the industrial automation system 10. In some embodiments, the OT device 67 may include motor control centers, motors, human machine interfaces (HMIs), operator interfaces, contactors, starters, sensors, drives, relays, protection devices, switchgear, compressors, network switches (e.g., Ethernet switches, modular-managed, fixed-managed, service-router, industrial, unmanaged, etc.) and the like. In addition, the OT device 67 may also be related to various industrial equipment such as mixers, machine conveyors, tanks, skids, specialized original equipment manufacturer machines, and the like. The OT device 67 may also be associated with devices used by the equipment such as scanners, gauges, valves, flow meters, and the like. In one embodiment, every aspect of the OT device 67 may be controlled or operated by the control system 66.

In the present embodiments described herein, the control system 66 may thus perform actions based on commands received from the container node 30. By mapping certain container lifecycle states into appropriate corresponding actions implementable by the control system 66, the container node 30 enables program content for the industrial control system 12 to be containerized, published to certain registries, and deployed using the controller container node 62, thereby bridging the gap between the IT-based container orchestration system 24 and the OT-based industrial control system 12.

Figure 4:
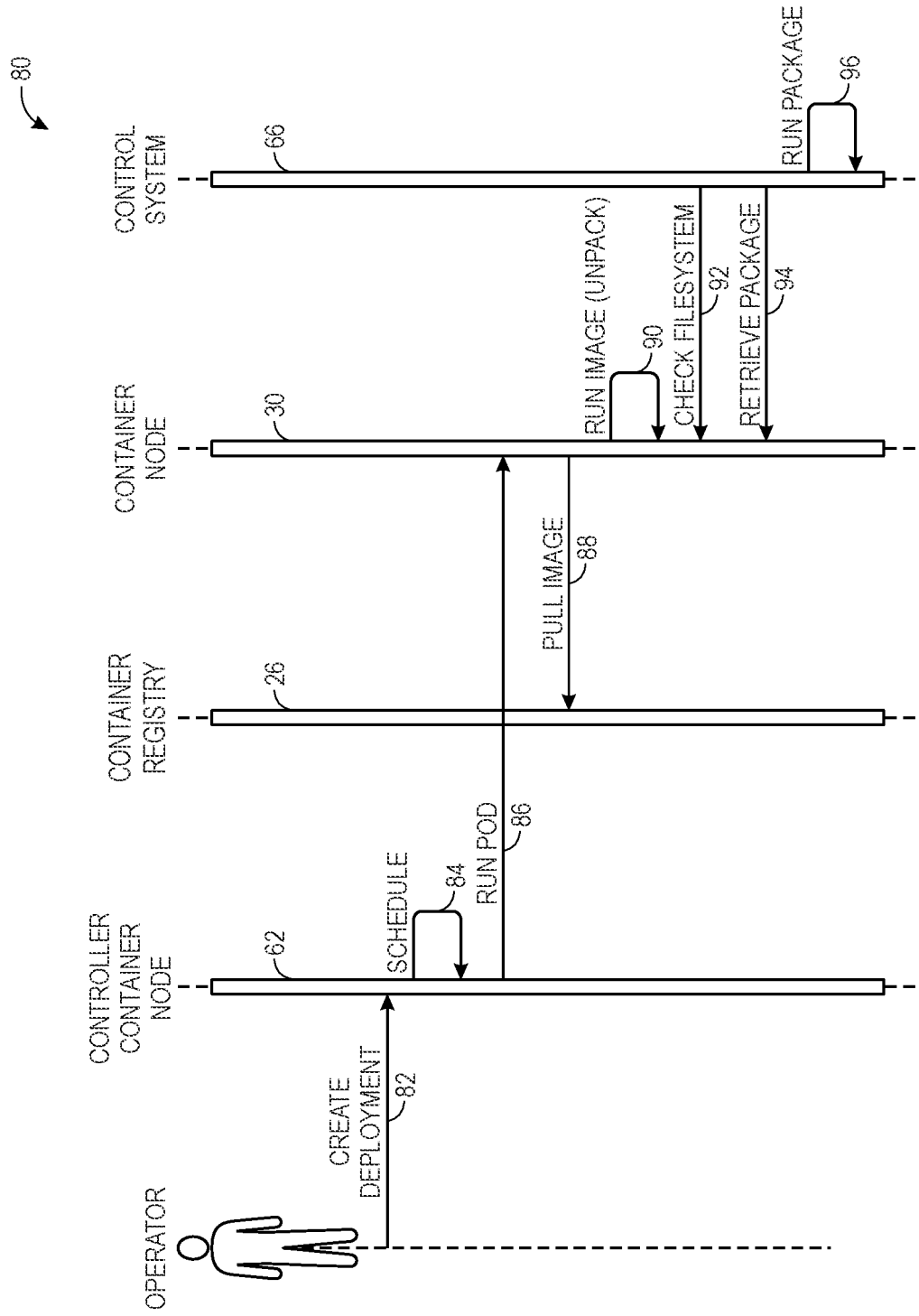
FIG. 4 is a data flow diagram illustrating the deployment of container pods to industrial control systems in the OT network of FIG. 3, in accordance with an embodiment.

FIG. 4 illustrates a data flow diagram 80 that tracks the deployment of a container using the controller container node 62 and the container node 30 described above with reference to FIG. 3. At step 82, the IDE tool 64 may create a deployment of the deployment configuration file 65 to the controller container node 62. After receiving the deployment configuration file 65, the controller container node 62 may identify a container node 30 that may fit the constraint specifications (e.g., memory, CPU availability) provided in the deployment configuration file 65. That is, the controller container node 62 performs scheduling operations that involve checking the state data for each node of the container orchestration system 24, determining whether a suitable node exists for the constraints provided in the deployment configuration file 65, and the like.

After identifying the suitable container node, at step 84, the controller container node 62 may schedule the deployment of the container to the respective container node 30. At step 86, the controller container node 62 may deploy a pod to the container node 30, which may cause the container node 30 to retrieve a container image 28 from the container registry 26 at step 88. In this way, the container node 30 is configured to receive pods from the controller container node 62 and execute the pods, although the control system 66 of the industrial control system 12 may not be able to execute the pod. After pulling the container image 28 from the container registry 26, the container node 30 may, at step 90, run the container image 28 or unpack the container image 28 and store an application or operation executable by the control system 66 in a file system. At step 92, the control system 66 may check the file system of the container node 30 for updates or newly stored packages. At step 94, the control system 66 may retrieve the stored package that may include the container scheduled for operation by the control system 66 by the controller container node 62 at step 84. At step 96, the control system 66 may execute the package retrieved from the file system of the container node 30. The container node 30 may then monitor the operations of the package being executed on the control system 66, the state (e.g., memory, CPU usage) of the control system 66 and send updates to the controller container node 62. If the container node 30 sends an updated indicative of the package no longer executing the package, the controller container node 62 may schedule deployment of another pod to another container node 30 for execution to maintain the desired state.

Figure 5:
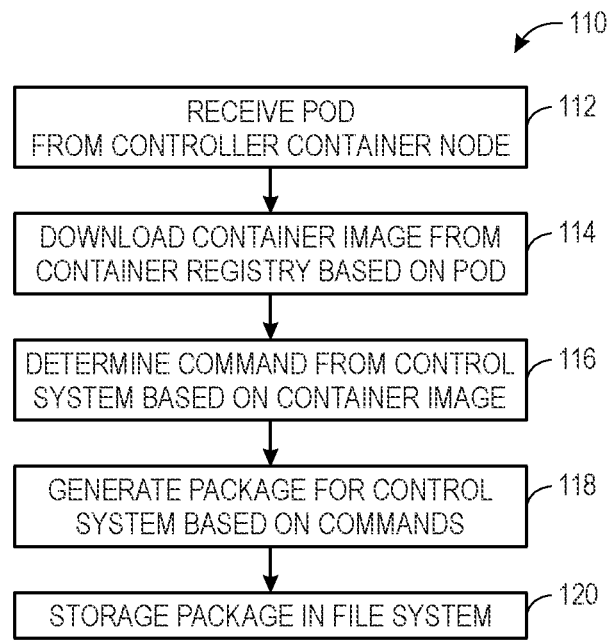
FIG. 5 is a flow chart of a method for the industrial control system passively implementing commands received via the control orchestration system, in accordance with an embodiment.

Keeping the foregoing in mind, FIG. 5 illustrates a method 110 in which the container node 30 may implement to coordinate activities via the controller container node 62 of the container orchestration system 24. Although the following description of the method 110 is described as being performed by the container node 30, it should be understood that any suitable container node that is configured to interface with the cluster of nodes of the container orchestration system 24 and the industrial control system 12 may perform the operations described herein. In addition, although the method 110 is described in particular order, it should be understood that the method 110 may be performed in any suitable order.

Referring now to FIG. 5, at block 112, the container node 30 may receive a pod from the controller container node 62. As mentioned above, pods may include one or more containers that are deployed to a host (e.g., container node 30). In some embodiments, the pod may operate to specify coordinated operations between a group of containers. The pod may include an indication or reference to a storage location for one or more container images 28 related to the pod. In some embodiments, the container images 28 may be stored in the container registry 26. As such, the pod may provide an indication of a network address or other address for accessing a memory location in the container registry 26.

After receiving the pod from the controller container node 62, at block 114, the container node 30 may download the related container images 28 from the container registry 26. The container image 28, as mentioned above, represents data that encapsulates an application and its software dependencies. The container images 28 may be executable software bundles that may execute as standalone software without regard to the operating system that the corresponding container node 30 is using. In some embodiments, the container node 30 may receive the container images directly from the container registry 26, via the controller container node 62, or any other suitable communication schemes.

After receiving the container images 28, at block 116, the container node 30 may run or unpack the container images 28 and determine commands that may be performed by the control system 66 based on the container images 28. That is, the container images 28 may include software applications that are executable by container nodes 30. However, the software applications may not be executable by the control system 66. As such, the container node 30 may determine commands for the control system 66 that correspond to the software applications encapsulated in the container images 28. In some embodiments, certain operations in the software applications may be mapped to certain operations that may be performed by the control system 66. For example, software application commands for create, run, start, pause, stop, and delete may map to download, download/run, run, idle, and unload commands, respectively, which may be performed by the control system 66.

After determining the commands that may be implemented by the control system 66 based on the container images 28, at block 118, the container node 30 may generate a package that may be retrieved and executed by the control system 66. That is, the container node 30 may organize or structure the determined commands into a software package that may be used by the control system 66. For example, if the control system 66 corresponds to a PLC, the package may be organized according to a programming structure (e.g. ladder logic) that the PLC may use to program itself.

At block 120, the container node 30 may store the package in a memory or filesystem that is accessible to the control system 66. In some embodiments, the container node 30 may not be capable of interfacing directly with the control system 66. However, the container node 30 may provide the control system 66 with access to its memory or storage components, such that the control system 66 may retrieve the stored package. The control system 66 may be programmed to periodically (e.g., daily, hourly) check the filesystem for updates or new packages available for downloading.

It should be noted that the method 110 may describe a passive-indirect mode of operation for the container node 30 as part of the container orchestration system 24. That is, the container node 30 is limited to performing a subset of commands that may be provided by the controller container node 62, as opposed to performing all of the commands that nodes that are part of the container orchestration system 24 are capable of performing. Moreover, the container node 30 may not be able to perform all of the lifecycle operations provided in a container. For example, the container node 30 may facilitate a package download operation for the control system 66, as described above, but it may not be able to perform every function specified in the container if the control system 66 does not have a corresponding operation that can be mapped to the respective container lifecycle operation.

In some embodiments, the container node 30 may operate in a passive-direct mode of operation in which the container node 30 may participate as a node in the container orchestration system 24. As such, the container node 30 may support a full set of container lifecycle operations. That is, since the control system 66 may be capable of implementing a limited set of commands provided by the controller container node 62, the container node 30 may be implemented or executed by a sidecar compute module that may host a container host daemon that may perform the full suite of operations that a node in the container orchestration system 24 may perform. As such, the sidecar compute module may be any suitable computing system that is capable of executing an operating system (OS), such that commands received from the controller container node 62 may be implemented by the respective sidecar compute module.

By implementing the container node 30 in the sidecar compute module, the container node 30 may be operating as a node that is part of the container orchestration system 24 but operating in the OT space. As a result, the container node 30 may extend the functions available via the container orchestration system 24 to OT devices 67 that are not typically visible to the controller container node 62 of the container orchestration system 24. To operate in the passive-direct mode, the container node 30 may include applications and/or APIs that interface directly with the control system 66 and the controller container node 62. As such, the container node 30 may provide a bi-directional bridge of communication between the control system 66 and the controller container node 62. In some embodiments, the container node 30 may include an API that translates the OT data received from the control system 66 into IT data that may be interpretable by the controller container node 62. As such, the container node 30 may provide the controller container node 62 with visibility into the operations and states of the OT devices 67 operating in the OT space.

Figure 6:
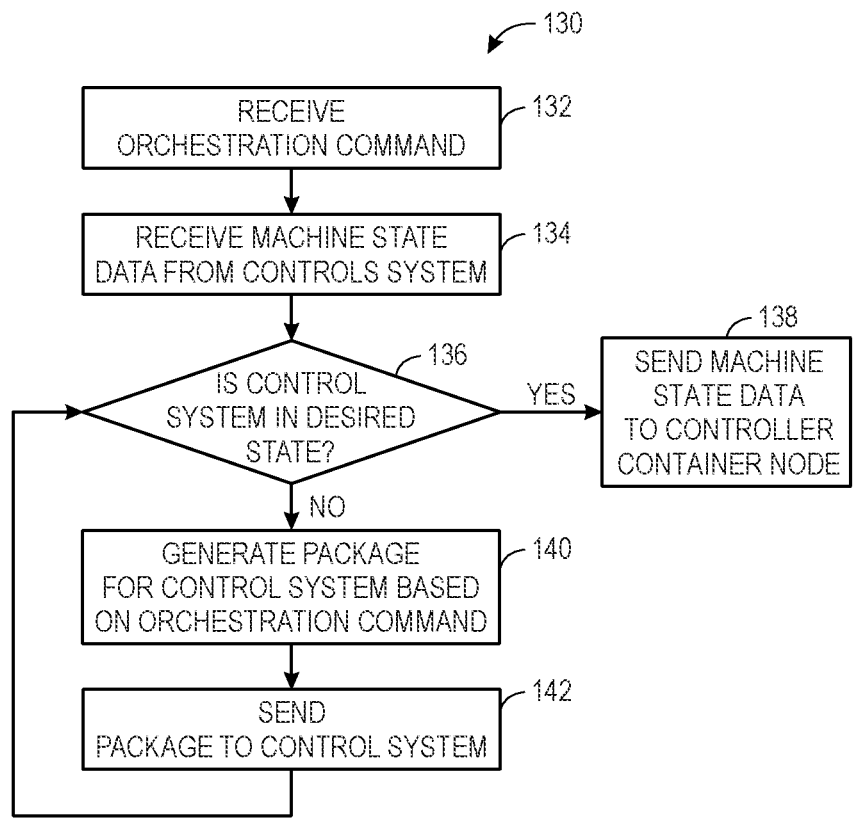
FIG. 6 is a flow chart of a method for the industrial control system actively implementing commands received via the control orchestration system, in accordance with an embodiment.

With this in mind, FIG. 6 illustrates a method 130 for the container node 30 directly sending packages to the control system 66 and machine state data to the controller container node 62 in accordance with embodiments described herein. Like the method 110 described above, the following description of the method 130 may be performed by any suitable computing system and any suitable order. It should be noted that the method 130 described below corresponds to operating the container node 30 in the passive-direct mode of operation. As such, the container node 30 may receive and interpret orchestration commands received from the controller container node 62 or the like and directly interface with the control system 66 to verify that the control system 66 is operating at the desired state.

Referring to FIG. 6, at block 132, the container node 30 may receive an orchestration command from the controller container node 62 or some other node that is part of the container orchestration system 24. The orchestration command may include an instruction regarding one or more containers that the control system 66 should currently be executing. As such, the orchestration command may be part of a monitor function that causes the container node 30 to verify that the machine state data of the control system 66 corresponds to an expected machine state, as specified by the deployment configuration file 65.

At block 134, the container node 30 may retrieve machine state data from the control system 66. The machine state data may include current operational state (e.g., active, inactive) of the respective OT device controlled by the control system 66, available processing resources (e.g., CPU availability), available memory resources (e.g., storage, RAM), and the like. The machine state data may also indicate whether any containers are being executed by the control system 66. As such, the machine state data may be reported back to the controller container node 62 to ensure that the desired state specified by the deployment configuration file 65 is present.

To receive the machine state data, the container node 30 may send requests to the control system 66 via an appropriate OT communication protocol. In response to receiving the requests, the control system 66 may query a database, memory cell, or other suitable storage that may include information regarding the requested data. After retrieving the requested information, the control system 66 may send the requested data to the container node 30 using the same OT communication protocol on which it received the request.

In some embodiments, the container node 30 may be embedded or integrated into one or more cores of the control system 66. As such, the container node 30 may communicate data with portions of the control system 66 using onboard communication methodologies. Alternatively, the container node 30 may directly retrieve the machine state data from the respective memory locations.

After receiving the machine state data from the control system 66, the container node 30 may, at block 136, determine whether the control system 66 is operating at a desired state based on the deployment configuration file 65. In the present embodiment, the container node 30 may evaluate whether the control system 66 is executing the containers, as specified in the deployment configuration file 65. That is, since the container node 30 may execute the container daemon host, the container node 30 may participate in the management of the containers distributed throughout the container orchestration system 24 by monitoring the machine state data of the control system 66.

If the control system 66 is operating in the desired state, the container node 30 may proceed to block 138 and send the machine state data to the controller container node 62. The controller container node 62 may then check whether other container nodes 30 are achieving the desire states.

If, however, the container node 30 determines that the control system 66 is not operating in the desired state, the container node 30 may proceed to block 140 and generate a package that may cause the control system 66 to modify its operations to execute the corresponding pod and the containers therein. After generating the package, the container node 30 may send the package directly to the control system 66 to execute. In this way, the container node 30 operate in the passive-direct mode because the container node 30 may directly send commands that cause the control system 66 to change operations. For example, instead of the control system 66 periodically checking the filesystem, as described above with respect to FIG. 5 (e.g., passive-indirect mode), the control system 66 may directly interface with the container node 30 and receive commands that may cause it to adjust operations of a connected device (e.g., OT device), execute received packages, and the like. As such, the container node 30 may push packages, firmware updates, OT device credential updates, security updates, encryption keys, and other data to the control system 66 at any given time. That is, the container system 66 may generate an event notification that causes an API or other component of the control system 66 to react in response to detecting the event notification. In this way, the container node 30 may actively participate in the coordination of containers with a respective control system 66 based on orchestration commands received passively from the controller container node 62 or the like.

By employing the container nodes 30 to enable the container orchestration system 24 to implement software containers on control systems 66, the present embodiments described herein may allow for coordinating control of a number of control systems 66 and a number of OT devices 67 to control operations in the industrial automation system 10. That is, desired machine states may include desired operating parameters for industrial equipment, and the container orchestration system 24 may monitor the available industrial equipment resources to ensure that the desired machine states are continuously being achieved by coordinating activities via the container nodes 30 communicatively coupled to the control systems 66.

In addition to operating in the passive-indirect mode and the passive-direct mode, the container node 30 may operate in an active mode, such that the container node may invoke container orchestration commands for other container nodes 30. For example, referring back to FIG. 3, a proxy node 32 may operate as a proxy or gateway node that is part of the container orchestration system 24. The proxy node 32 may be implemented in a sidecar computing module that has an operating system (OS) that supports the container host daemon. In another embodiment, the proxy node 32 may be implemented directly on a core of the control system 66 that is configured (e.g., partitioned), such that the control system 66 may operate using an operating system that allows the container node 30 to execute orchestration commands and serve as part of the container orchestration system 24. In either case, the proxy node 32 may serve as a bi-directional bridge for IT/OT orchestration that enables automation functions to be performed in IT devices based on OT data and in OT devices 67 based on IT data. For instance, the proxy node 32 may acquire OT device tree data, state data for an OT device, descriptive metadata associated with corresponding OT data, versioning data for OT devices 67, certificate/key data for the OT device, and other relevant OT data via OT communication protocols. The proxy node 32 may then translate the OT data into IT data that may be formatted to enable the controller container node 62 to extract relevant data (e.g., machine state data) to perform scheduling operations and to ensure that the container orchestration system 24 and the connected control systems 66 are operating at the desired state. Based on the results of its scheduling operations, the controller container node 62 may issue supervisory control commands to targeted OT devices via the proxy nodes 32, which may translate and forward the translated commands to the respective control system 66 via the appropriate OT communication protocol.

In addition, the proxy node 32 may also perform certain supervisory operations based on its analysis of the machine state data of the respective control system 66. As a result of its analysis, the proxy node 32 may issue commands and/or pods to other nodes that are part of the container orchestration system 24. For example, referring to FIG. 3, the proxy node 32 may send instructions or pods to other worker container nodes 68 that may be part of the container orchestration system 24. The worker container nodes 68 may corresponds to other container nodes 30 that are communicatively coupled to other control systems 70 for controlling other OT devices 71. In this way, the proxy node 32 may translate or forward commands directly to other control systems 70 via certain OT communication protocols or indirectly via the other worker container nodes 68 associated with the other control systems 70. In addition, the proxy node 32 may receive replies from the control systems 70 via the OT communication protocol and translate the replies, such that the nodes in the container orchestration system 24 may interpret the replies. In this way, the container orchestration system 24 may effectively perform health checks, send configuration updates, provide firmware patches, execute key refreshes, and provide other services to OT devices 71 in a coordinated fashion. That is, the proxy node 32 may enable the container orchestration system to coordinate the activities of multiple control systems 66 and 70 to achieve a collection of desired machine states for the connected OT devices 67 and 71.

As discussed herein, the industrial automation system 10 may include many OT devices and/or IT devices distributed among different network layers. In particular, some devices associated with operation of the industrial automation system 10 may be located relatively closer to a physical process in which industrial components (e.g., machines) are employed, whereas, some devices may be located relatively farther (e.g., with respect to a data pathway) from the industrial components. In other words, the industrial automation system 10 may be distributed among a hierarchy of the network layers, with some devices disposed at lower levels of the hierarchy, while other devices may be disposed at a higher level, relative to a pathway of OT data and/or IT data. For example, devices at the relatively higher hierarchy levels may have an ability to view or access multiple devices on any level lower than and/or equal to its respective level. As such, containers deployed to and/or operating on higher level devices may be suited to perform data analysis via data contextualization and/or crowd-sourcing to identify anomalies and/or indications of potential anomalies, and identify appropriate remedial actions associated with the identified anomalies, as discussed herein.

Figure 7:
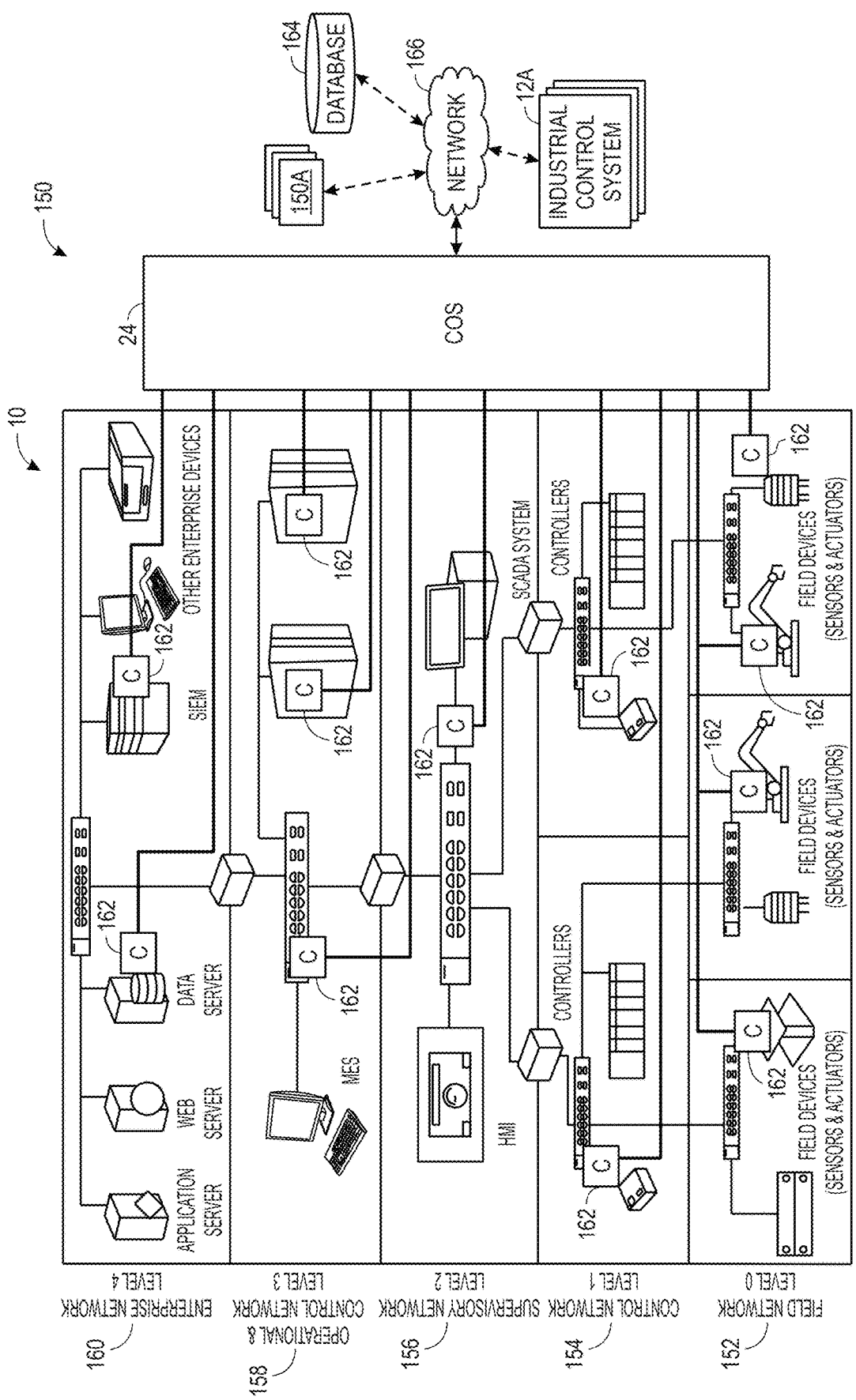
FIG. 7 is a schematic diagram of an example hierarchical structure of the container orchestration system coordinating within an OT network of FIG. 3, in accordance with an embodiment.

With the foregoing in mind, FIG. 7 is a schematic diagram 150 of the various levels of computing associated with an example industrial automation system 10. The hierarchical levels, in which the industrial automation system 10 may operate, include a field network level 152 (e.g., level 0), a control network level 154 (e.g., level 1), a supervisory network level 156 (e.g., level 2), an operational and control level 158 (e.g., level 3), and an enterprise network level 160 (e.g., level 4). Different control systems, controllers, software applications, devices, and computing systems may operate with each other within an enterprise to enable organizations to effectively control operations of components in the industrial automation system 10. For example, the physical process in which industrial components (e.g., machines) are employed to physically modify raw materials may be part of the physical process level, which may be controlled or monitored by components in an intelligent device level. An intelligent device level may include sensors, analyzers, actuators, and other instrumentation that may sense and manipulate the physical process. The industrial components at both a physical process level and the intelligent device level may be a part of the field network level 152. The field network level 152 involves the actual production process of transforming raw materials (e.g., grains, wheat) into products (e.g., cereal) as well as sensing and manipulating the production process within the industrial automation system 10 (e.g., food manufacturing plant). Containers 162 deployed to the field network level 152 may be executed by local controller circuitry of respective sensors, actuators, OT devices, or the like. It is noted that devices in higher network levels may be able to access data in lower network levels.

The control network level 154 may be positioned at a higher hierarchical level with respect to field network level 152. The control network level 154 may include controllers to provide supervising, monitoring, and controlling operations (e.g., continuous control, discrete control) for the physical process associated with the industrial components.

When a container 162 is unable to be deployed to the field network level 152, sometimes the container 162 is deployed to a device in the control network level 154, which may be considered an edge device. The edge device running the container 162 may acquire data produced by devices, sensors, actuators in the field network level 152 and perform processing according to instructions associated with the container 162. Containers 162 deployed to the control network level 154 may have access to data acquired or generated by containers 162 deployed on devices in lower levels or devices in lower levels (e.g., field network level 152).

The supervisory network level 156 may be positioned at a higher hierarchical level with respect to the control network level 154 that regulates the controllers of the control network level 154. By way of example, the supervisory network level 156 may include real-time control hardware and software, HMI, programmable logic controller (PLC), supervisory and data acquisition (SCADA) software, and the like. The PLC may be an industrial solid-state computer that monitors inputs and outputs of the industrial automation system 10 and makes logic-based decisions for automated processes of the industrial automation system 10. Further, the SCADA may analyze real or near real-time data from industrial components and subsequently control the industrial components. Containers 162 deployed to the supervisory network level 156 may have access to data acquired or generated by containers 108 deployed on devices in lower levels or devices in lower levels (e.g., field network level 152, control network level 154).

The operational and control level 158 may be positioned at a higher hierarchal level with respect to the supervisory network level 156. The operational and control level 158 may include manufacturing application system, which may any suitable IoT system that supports manufacturing processes. In some embodiments, the manufacturing application system may include manufacturing execution system (MES) or a manufacturing operations management (MOM) that manage production workflow to produce the desired products, batch management, laboratory, maintenance and plant performance management systems, data historians, related middleware, and the like. The MES and MOM may involve monitoring data with respect to various time frames, such as duration of communication between components, minutes, seconds, and the like. Containers 162 deployed to the operational and control level 158 may have access to data acquired or generated by containers 162 deployed on devices in lower levels or devices in lower levels (e.g., field network level 152, control network level 154, supervisory network level 156).

In particular, the MES may include a number of software and hardware components that operate together to monitor the operations of the various components (e.g., databases, servers, devices) that are used to perform the manufacturing operations. The infrastructure of the manufacturing applications system may include the software and hardware components that control the distribution of data and information between various components in the manufacturing application system level and other levels discussed above. By way of example, the components of the manufacturing application system may include a server, a database, a database server, an application server, network controllers, routers, interfaces, and the like. In addition, the components of the manufacturing application system may include software applications and processes that operate to control the flow of data and information between the various components employed by the manufacturing applications systems.

Positioned above the operational and control level 158, the enterprise network level 160 may manage business-related activities of the manufacturing operation. For instance, the enterprise network level 160 may establish production schedule, material use, shipping, and inventory levels to support the operations monitored by the components (e.g., databases, servers) in the operational and control level 158. The enterprise network level 160 may also include application servers, web servers, data servers, security information and event management (SIEM), and other enterprise devices. Containers 162 deployed to the enterprise network level 160 may have access to data acquired or generated by containers 162 deployed on devices in lower levels or devices in lower levels (e.g., field network level 152, control network level 154, supervisory network level 156, operational and control network level 158).

Devices in each of these levels may correspond to different hierarchical locations within the device hierarchy. Hierarchical locations may be generally arranged based on the levels. A hierarchical location of a device may indicate the physical or logical placement of the device within the industrial automation system 10 device hierarchy (e.g., represented via schematic diagram 150). When designing and/or managing control operations within the industrial automation system 10, the hierarchical locations may be considered since the hierarchical locations may impact latency, communication speeds, and/or power consumption.

As mentioned above, a container 162 deployed in the industrial automation system 10 may be a data collecting (e.g., data acquisition) process that monitors for specific data produced by one or more devices for a threshold duration of time or quantity of data, may perform one or more operations based on computer-implemented instructions associated or contained within the infrastructure of the container 162, or the like. After a threshold amount of data is gathered or a threshold amount of time has been reached, or data is received from a data source, the container 162 may commence processing, analysis, and/or transmission of the data to be sent to a different device in a same or different level. In this way, some container 162 may be non-perpetual operations that have distinct start and end times. When a container 162 completes its operation, it is terminated and no further computing resources or memory are dedicated to that container 162 at the deployed device.

Furthermore, as discussed herein, the container orchestration system 24 may operate within the industrial automation system 10, and manage deployment of containers 162 to the devices within the hierarchical levels of the industrial automation system 10. In particular, the container orchestration system 24 may utilize containers to gather and/or collect data, analyze the data, generate contextualized data patterns, identify anomalies and/or identify remedial actions associated with the anomalies. In some embodiments, the container orchestration system 24 may be coupled (e.g., communicatively coupled) to a database 164 (e.g., remote database 164), one or more other industrial automation systems 150A (e.g., other hierarchies, other container orchestration systems), one or more other industrial control systems 12A, or any combination thereof via a network 166. The network 166 may be a wireless communication network such as a local area network (LAN), the internet, a wide area network (WAN), or the like. Furthermore, the container orchestration system 24 may send data to and/or receive data from, via the network 166, the database 164, the one or more other industrial automation systems 150A (e.g., other hierarchies), the one or more other industrial control systems 12A, or any combination thereof. In particular, in some embodiments, the container orchestration system 24 may request another container orchestration system of the one or more other industrial automation systems 150A to deploy containers 162 within the respective industrial automation system 150A hierarchy to identify anomalies and/or identify remedial actions based on contextualized data generated by the container orchestration system 24. Additional details are discussed below with reference to FIG. 8.

In some embodiments, deploying the one or more containers 162 may be based on a trigger event, such as receiving an indication of an anomaly (e.g., detected data values outside of a threshold range of data values), receiving an indication of a potential anomaly, receiving a command from an industrial automation device, or the like. These examples are described herein. However, it should be understood that other deployment conditions or considerations may be used when determining whether to deploy a container 108 to contextualize data associated with the anomaly for identifying the anomaly and/or determining an appropriate remedial action associated with the anomaly.

Figure 8:
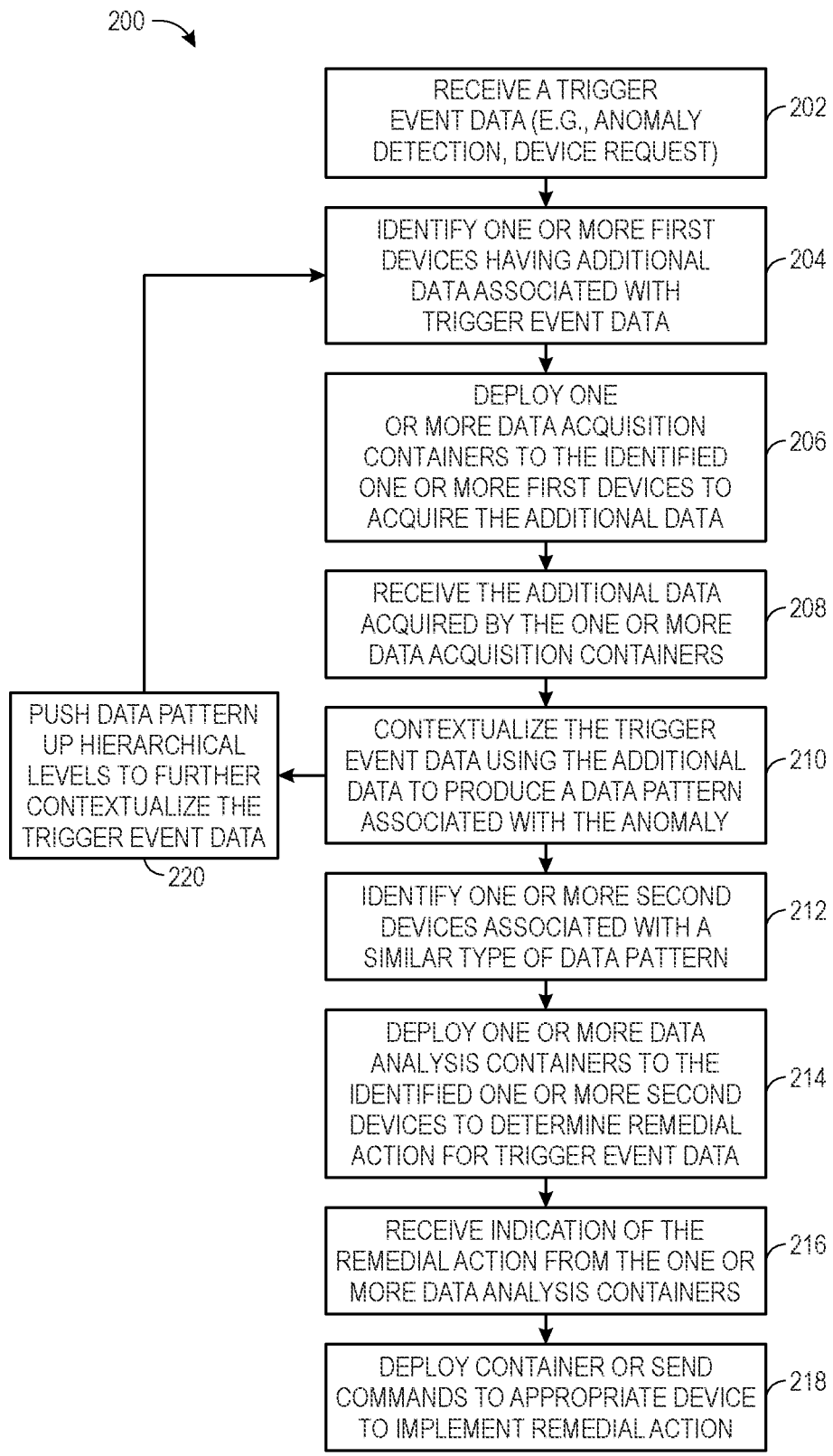
FIG. 8 is a flow chart of a method for the container orchestration system of FIG. 3 deploying containers to one or more devices to contextualize data for identifying an anomaly and/or remedial actions associated with the anomaly, in accordance with an embodiment.

To elaborate on container operations, FIG. 8 depicts a flow chart of a method 200 for the container orchestration system 24 of FIG. 3 deploying one or more containers 162 to one or more devices to contextualize data for identifying an anomaly and/or remedial actions associated with the anomaly. Although the following description of the method 200 is described as being performed by the container orchestration system 24, it should be understood that any suitable container node 30 that may interface with the cluster of nodes of the container orchestration system 24 and the industrial control system 12 may perform the operations described herein. In addition, although the method 200 is described in particular order, it should be understood that the method 200 may be performed in any suitable order.

The container orchestration system 24 may, at block 202, receive and/or determine that a trigger event has occurred. In some embodiments, the container orchestration system 24 may receive trigger event data and/or data indicating that a trigger event has occurred. The trigger event may correspond to the container orchestration system 24 detecting an operational anomaly, such as detecting when operations differ from a historic trend of operation, detecting when sensing data obtained exceeds or cross a set threshold corresponding to that type of sensing data, or the like. In some systems, the trigger event corresponds to the container orchestration system 24 receiving a device request to deploy a container 162, such as, for example, a data acquisition container and/or a data analysis container. For example, an industrial automation device may request additional analysis be performed and/or additional data be acquired by transmitting the request to the container orchestration system 24 to trigger the deployment of the container 162. In some embodiments, the container orchestration system 24 may include or communicatively couple to a time keeping device that tracks passage of time to aid in scheduling containers 162, to deploy containers 162 according to a schedule, to determine when to deploy a container 162, and the like.

The trigger event may correspond to the container orchestration system 24 detecting or receiving indication of an operational anomaly (e.g., anomaly detection). The anomaly detection may be performed by a container 162 deployed in the industrial automation system 10 and/or by an industrial automation device that has indicated the anomaly. Sometimes, the industrial control system 12 may work in concert with the container orchestration system 24 to identify when anomalous events occur and are to be further investigated via deployment of additional containers 162. Moreover, OT devices 67, 71 may sometimes perform anomaly detection, such as when local control circuitry processing sensing data acquired by a local sensor. The operational anomaly may correspond to a current operation deviating from an expected operation by a threshold amount of value. For example, the operational anomaly may correspond to a sensor acquiring data that indicates a motor is rotating at a speed 10% greater than a normal operational speed and thus may trigger an indication of operational anomaly to be received by the container orchestration system 24. In any of these cases, an alert may be generated and delivered to (or identified by) the container orchestration system 24 and the container orchestration system 24 may determine the alert to be a trigger event. The alert may be communicated via a status accessible by the container orchestration system 24.

The trigger event may correspond to the container orchestration system 24 receiving a request from a container 162 requesting data acquirable by a device, where the container 162 may be in a relatively higher level than the lower level device. The request may include metadata or indications of parameters and/or operations by which to perform the request. Sometimes the container orchestration system 24 may determine the additional data based on data indicated by the request. For example, the request may include an indication of additional data or target device requested by a container 162. In some cases, the container orchestration system 24 may use one or more containers 162 to process raw data from a lower level device into transformed data for transmission to higher level or edge devices. In this way, the processed raw data may have a slower data rate than the raw data obtained at the lower level device and thus be easier to handle when transmitting to the higher level devices. Thus, the container orchestration system 24 may down-sample the data and reduce the amount of data transmitted up the device hierarchy (e.g., represented via schematic diagram 150), and thus the amount of data being handled by edge devices, data servers, web servers, other memory, or the like.

Upon receiving the trigger event data, at block 204, the container orchestration system 24 may identify one or more devices that may include additional data associated with the trigger event data. In some cases, the identified one or more devices may include a device associated with the trigger event data. Additionally or alternatively, the identified one or more devices may include other devices in proximity to the device associated with the trigger event. In particular, the container orchestration system 24 may identify one or more industrial devices located upstream and/or downstream of the trigger event (e.g., the device associated with the trigger event) with respect to an industrial automation assembly line. In some embodiments, the container orchestration system 24 may identify one or more control systems and/or devices that are associated with operations of the device associated with the trigger event. Furthermore, in some embodiments, the identified one or more devices associated with the trigger event may be at a higher hierarchical level, a same hierarchical level, a lower hierarchical level, or a combination thereof, with respect to the device associated with the trigger event.

In particular, the container orchestration system 24 may identify the additional data and/or the one or more devices based on a device hierarchy, such as a system topology. The device hierarchy thus includes up-to-date indications of computing layers, devices, containers 162 or the like that may respectively produce, acquire, or have the ability to inspect various datasets. The container orchestration system 24 may identify the additional data and devices based on relationships between devices indicated in the device hierarchy. The relationships may be connections between the devices that cause interdependencies of the industrial automation system 10 operations to the devices. In this way, the relationships may indicate an operational connection between the device related to the trigger event and other devices also related to the device. For example, an anomalous operation in one OT device 67 may affect operations downstream or upstream of that OT device 67 or an associated portion of the industrial automation system 10. Thus, the container orchestration system 24 may deploy containers 162 to one or more devices upstream, downstream, or otherwise found related to the OT device 67, where the relation between OT devices 67, 71 or other devices of the industrial automation system 10 may be reflected in the device hierarchy. As an example, the trigger event data may be temperature data received from an industrial oven sensor, wherein the temperature data is outside of a threshold temperature range (e.g., indication of a burn), and the container orchestration system 24 may identify additional sensors and/or devices receiving additional sensor data associated with the operations of the industrial oven, such as devices receiving ambient temperature data and/or ambient humidity data (e.g., from ambient temperature/humidity sensors).

Before deploying a container 162, the container orchestration system 24 may determine which containers 162 are already deployed based on its record of previously deployed containers 162 and/or a list of containers currently being executed. The container orchestration system 24 may retrieve machine state data from one or more control systems associated with the one or more devices, such as the control system 66. The machine state data may include current operational state (e.g., active, inactive) of a respective OT device (e.g., a respective device of the one or more devices) controlled by the control system, available processing resources (e.g., CPU availability), available memory resources (e.g., storage, RAM), and the like. The machine state data may also indicate whether any containers are being executed by the control system 66. As such, the machine state data may be reported back to the controller container node 62 to ensure that the desired state specified by the deployment configuration file 65 is present.

Based on which containers 162 are actively being executed, the container orchestration system 24 may determine a schedule of times by which to coordinate container 162 deployment. The container orchestration system 24 may do so based on the machine state data. For example, based on available processing resources (e.g., CPU availability), available memory resource, and respective data about the currently executed containers, the container orchestration system 24 may schedule and/or deploy the desired container 162.

Continuing in block 206, the container orchestration system 24 may deploy one or more data acquisition containers to the identified one or more devices (e.g., additional devices associated with the trigger event data) to acquire additional data. In some cases, the container orchestration system 24 may deploy the one or more data acquisition containers directly to the identified one or more devices that contain the additional data associated with the trigger event. In some embodiments, the container orchestrations system 24 may deploy the one or more data acquisition containers near (e.g., to a higher hierarchical level) the one or more identified devices that contain the additional data (e.g., to devices communicatively coupled to the one or more identified devices that contain the additional data) to retrieve the additional data. Continuing with the industrial oven example above, the container orchestration system 24 may identify a device that contains additional sensor data associated with the operations of the industrial oven (e.g., ambient temperature data, ambient humidity data). The container orchestration system 24 may query the device to determine the respective machine state of the device (e.g., available compute space). The container orchestration system 24 may receive an indication that the device does not have enough available compute space to run the one or more data acquisition containers. Based on the received machine state of the device, the container orchestration system 24 may identify an additional device communicatively coupled to the device that either contains the additional data or can retrieve the additional data. In addition, the container orchestration system 24 may query the additional device and determine that the additional device does have available compute space to run the one or more data acquisition containers. In some embodiments, the additional device may be on a same hierarchical level or higher hierarchical level as the identified device associated with the additional data. The container orchestration system 24 may then deploy the one or more data acquisition containers to the additional device to gather the additional data.

Different containers 162 may be deployed to different devices depending on the type of targeted device (e.g., device identified as having the additional data) and the characteristics of the targeted data (e.g., the additional data). Any suitable additional data and/or devices may be identified as targets. For example, a device to deploy the container 162 to may or may not be an OT device 67, 71. In some cases, the container orchestration system 24 may deploy containers 162 to IT devices, devices in hierarchical levels above level 0 (e.g., devices in a level higher than a field network level 0), device in the field network level 0, OT device 67, 71, or the like, and thus devices referred to in FIG. 8 may refer to one or more of these various devices.

Continuing with FIG. 8, in block 208, the container orchestration system 24 may receive the additional data via the one or more data acquisition containers 162. In particular, after a container 162 is deployed, the container orchestration system 24 may receive data acquired by or generated by the deployed container 162. The deployed container 162 may expose the data acquired or generated via symbol and template data access methods, via direct messaging operations, by exposing the data via consumer/producer data access methods, where the container orchestration system 24 may subscribe to data generated by the deployed container 162, or the like. Indeed, any suitable data transmission or communication method may be used to communicate data between the container orchestration system 24 and the deployed container 162. In some embodiments, the additional data may include data of a same data type as the trigger event data. For example, using the industrial oven example above, the additional data may include additional temperature data of the industrial oven detected at different instances (e.g., instances/times before and after the trigger event, from different batches, etc.) during operation of the industrial oven. Additionally or alternatively, the additional data may include a different data type as the trigger event data and be associated with the industrial automation equipment associated with trigger event data. For example, using the industrial oven example, the additional data may include data associated with the industrial oven, such as identifying data that may indicate that the industrial automation equipment associated with the trigger event temperature data is a particular type of industrial oven. Furthermore, in some embodiments, the additional data may include data of a different data type than the trigger event data and/or may be associated with other industrial automation equipment (e.g., equipment upstream and/or downstream of the trigger event). In particular, the additional data may include data indicative of environment conditions associated with the trigger event, and/or data associated with operational data (e.g., parameters, conditions) of devices downstream of the trigger event and/or upstream of the trigger event with respect to an industrial automation assembly line. Returning to the industrial oven example, the additional data may comprise ambient temperature data, ambient humidity data, and/or operational data associated with industrial automation equipment upstream and/or downstream of the industrial oven, with respect to a production line including the industrial oven.

In block 210, the container orchestration system 24 may contextualize the trigger event data with the additional data to produce a data pattern associated with the trigger event data. In particular, the container orchestration system 24 may produce (e.g., generate) a data pattern based on the contextualization of the trigger event data using the additional data. Data patterns may include a collection of datasets from various data sources (e.g., devices within a same hierarchical level, adjacent hierarchical levels) that corresponds to a time period (e.g., a threshold amount of time before and after detected anomaly) that includes a time in which the anomaly was detected. As such, the data patterns may provide expected datasets from various data sources at various hierarchical levels of the industrial system related to a detected anomaly.

In block 212, the container orchestration system 24 may then identify one or more other devices that may contain similar data pattern and/or similar contextualized data based on the produced data pattern. The container orchestration system 24 may identify such devices based on the one or more other devices being of a similar type (e.g., identification) and/or a similar function as the device associated with the trigger event data and/or the one or more devices associated with the produced data pattern. Additionally or alternatively, the container orchestration system may identify the other devices based on hierarchical level of the other devices. In particular, the container orchestration system may crowd-source devices on a same hierarchical level or different hierarchical level as the device associated with the trigger event data to identify similar contextualized data and/or data patterns. As discussed herein, devices of the industrial automation system 10 may be arranged and/or associated with particular hierarchical levels. As illustrated in FIG. 7, field devices such as sensors and actuators may be included in a lower hierarchical level, whereas controllers, SCADA system devices (e.g., edge devices), and data server devices may be associated with higher hierarchical levels. The container orchestration system 24 may identify other devices that are at a similar hierarchical level as the devices associated with the data pattern as devices that may contain similar data patterns (e.g., as these devices may gather and/or analyze similar operational data in a similar way). Returning to the industrial oven example, the container orchestration system 24 may produce the data pattern in association with a first edge device at a particular hierarchical level, wherein the first edge device may receive data associated with a first set of controllers, sensors, and actuators of the industrial oven associated with the trigger event. Furthermore, the container orchestration system 24 may identify a second edge device at the same hierarchical level as the first edge device that may receive data associated with a second set of controllers, sensors, actuators of a different industrial oven within the same industrial automation system (e.g., a different oven at the same facility).

In some cases, the container orchestration system 24 may additionally or alternatively identify the one or more other devices located in remote systems and/or databases (e.g., coupled via the network 166) that may contain the similar data patterns and/or the similar contextualized data. In particular, the one or more other devices may be associated with other container orchestration systems 150A (e.g., other industrial automation systems 150A, other facilities in other geographic locations), and/or other industrial control systems 12A (e.g., of other systems within a same facility; may coordinate same or different operations). The container orchestration system 24 may query, via the network 166, the other container orchestration systems 150A and/or devices of other industrial control systems 12A to identify the one or more other devices that may contain similar data patterns. In addition, the container orchestration system 24 may be communicatively coupled (e.g., via the network 166) to the database 164 that may store previously produced data patterns and/or an indication of previously produced data patterns. The database 164 may store the previously produced data patterns in association with respective one or more devices, a respective trigger event, and/or a respective remedial action. The container orchestration system 24 may query the database 164 and identify the other one or more devices and/or a remedial action based on the produced data pattern correlating to one or more of the stored previously produced data patterns.

After identifying the one or more other devices, in block 214, the container orchestration system 24 may deploy one or more data analysis containers 162 to the identified one or more other devices to determine a respective remedial action associated with the trigger event based on the data patterns associated with the one or more identified devices correlating with (e.g., matching) the produced data pattern associated with the trigger event. In some cases, the one or more data analysis containers 162 may additionally or alternatively identify the trigger event based on the produced data pattern correlating with the data patterns associated with the one or more identified devices, and the container orchestration system 24 may receive the identification of the trigger event and determine the remedial action based on the identification of the trigger event. In some embodiments, an indication of the remedial action may be associated with the data patterns of the one or more identified devices and thus, the one or more data analysis containers 162 may compare the produced data pattern associated with the trigger event to the data patterns of the one or more identified devices and determine the remedial action based on the produced data pattern correlating with a data pattern associated with at least one identified device of the one or more identified devices.

Returning to the industrial oven example discussed above, the container orchestration system 24 may deploy the one or more data analysis containers 162 to the identified second edge device, and the one or more data analysis containers 162 may then compare the produced data pattern associated with the trigger event (e.g., the burn) to one or more data patterns contained on the second edge device. In particular, as discussed herein, the second edge device may contain data associated with a second set of controllers, sensors, actuators of a different industrial oven. The one or more data analysis containers 162 may analyze the data of the second edge device and identify data patterns that correlate with the produced data pattern of the first edge device associated with the trigger event (e.g., the burn). If a data pattern of the second edge device is found to correlate with the produced data pattern, the one or more data analysis containers 162 may further analyze the data pattern to determine any indication of a remedial action. If a remedial action is identified, the one or more data analysis containers 162 may transmit the indication of the remedial action to the container orchestration system.

In some embodiments, the container orchestration system 24 may deploy and/or instruct another container orchestration system 150A, via the network 166, to deploy one or more data analysis containers 162 within a remote systems identified as being associated with the similar contextualized data pattern to identify the trigger event (e.g., trigger event type) and/or identify a remedial action associated with the trigger event. In some embodiments, identification of the trigger event and/or the remedial action may be located on one or more devices associated with the other container orchestration system 150A and/or the other industrial control system 12A, and the container orchestration system 24 may receive an indication of the identification of the trigger event and/or the remedial action from the another container orchestration system, and/or the another industrial control system, via the network.

In some embodiments, data patterns may be stored and/or cataloged via the database 164, and the container orchestration system 24 may query, via the network 166, the database 164 based on the generated data pattern and may receive correlating data patterns (e.g., or an indication of the correlating data patterns), an indication of a device associated with a correlating data pattern, and/or an indication of a remedial action associated with the correlating data pattern, from the database 164. In addition, the container orchestration system 24, may deploy the one or more data analysis containers 162 to one or more identified devices based on information received from the database 164. In some embodiments, the remedial actions may be determined via a lookup table, a script, an algorithm, a machine learning model, accessing a database, following a workflow or decision tree, analysis of historical data, and so forth, and may involve the container orchestration system 24 coordinating a remedial control operation with the industrial control system 12, updating an indication of a maintenance schedule to schedule one or more recommend remedial maintenance actions, or the like.

The remedial actions may include, for example, generating a control signal to adjust an operating parameter (e.g., speed of rotation, frequency of operation, power), recommending a maintenance action like replacing and/or servicing bearings, clearing a machine jam, adjusting fasteners, replacing a seal, or the like, performing a maintenance operation like performing a calibration operation on a component, updating software/firmware, and so forth. In some embodiments, the container orchestration system 24 may automatically implement remedial actions. For example, certain remedial actions may be pre-approved or otherwise indicated in metadata for automatic implementation. In other embodiments, the container orchestration system 24 may propose one or more remedial actions to a user for approval/selection before implementation. Further, other remedial actions (e.g., replacing a seal, replacing a component, clearing a machine jam, replacing a hose) may be recommended to be performed and/or automatically added to maintenance records to be performed. If the condition persists or is otherwise unresolved, some or all of the operations to deploy containers 162 may be repeated with a different diagnosis and/or remedial action. After the condition has been resolved (e.g., a confirmation is received that the condition has been resolved and the OT device is operating as expected) or another condition is met, the container 162 may be spun down or otherwise stopped so the resources utilized by the container 162 may be made available for other functions.

Furthermore, in block 216, the container orchestration system 24 may receive an indication of the identified trigger event and/or identified remedial action from the one or more data analysis containers 162, and, in block 218, deploy additional one or more containers 162 or transmit control instructions to appropriate devices to implement the remedial action associated with the trigger event. As in the industrial oven example, upon identifying and/or receiving an indication of the appropriate remedial action, the container orchestration system 24 may deploy additional one or more containers 162 to a control system associated with operation of the industrial oven to adjust a temperature of the industrial oven. Thus, the container orchestration system 24 may deploy one or more containers 162 to automatically gather and contextualize data associated with a trigger event, identify the trigger event and/or remedial action associated with the trigger event based on the contextualized data, and implement corrective actions associated with detected trigger event, to rapidly and efficiently respond to the detected anomalies and assist in maintaining stable and consistent operations of industrial devices of the industrial automation system 10.

In some embodiments, in block 220, the container orchestration system 24 may push the generated data pattern to devices (e.g., via containers 162) of consecutively higher hierarchical levels to further contextualize the generated data pattern before identifying the one or more other devices that may contain similar data patterns. For example, the produced data pattern at a first hierarchical level may not bring about an identification of any other devices that contain a similar data pattern, and in response, the container orchestration system 24 may identify one or more devices of a second hierarchical level that is higher than the first hierarchical level that have additional data associated with the trigger event data. Furthermore, the container orchestration system 24 may deploy one or more additional data gathering containers 162 to the identified one or more devices of the higher second hierarchical level to acquire additional data associated with the trigger event data. The container orchestration system may then receive the additional data and further contextualize the data pattern with the additional data to produce an additional generated data pattern.

The operations of the container orchestration system may continue, as discussed above through blocks 212-218, to identify other devices with similar data patterns, receive an indication of a remedial action associated with the trigger event, and implement the remedial action using containers 162. Additionally, in some cases, the container orchestration system may continue to push the data pattern up the hierarchical levels and further contextualize the data using containers 162 until a data pattern is produced that causes identification of the other devices (e.g., by the container orchestration system) that may contain similar data patterns.

Furthermore, in some embodiments, the container orchestration system 24 may include guardrails associated with one or more containers 162, applications, and/or remedial actions to mitigate misidentification of remedial actions, improper implementation of remedial actions, and/or to protect against malicious data (e.g., fake data patterns) that are intended to interrupt stable and consistent operations of the industrial devices. In addition, the container orchestration system 24 may associate data patterns with remedial actions and/or identities of the trigger events, and store the data patterns and associations in a database 164. The database 164 may also include one or more models of data patterns and associated remedial actions. The container orchestration system 24 may use the methods discussed herein to update the models based on received feedback from implementation of the remedial actions. For example, the container orchestration system 24 may use the methods described herein to receive an indication of a newly identified remedial action and deploy one or more containers 162 to implement the newly identified remedial action associated with a known data pattern. Furthermore, the container orchestration system 24 may deploy one or more containers 162 to gather data associated with implementation of a newly identified remedial action. The container orchestration system may deploy one or more additional containers 162 to analyze the data and produce a result (e.g., determine effectiveness) of the newly identified remedial action, and the container orchestration system 24 may compare the result to a result of a stored model associated with a previous remedial action associated with the known data pattern. Based on the comparison, the container orchestration system 24 may update the model by association the data pattern with the newly identified remedial action. In this way, the container orchestration system 24 may continuously update associations between triggering events and identified remedial actions to increase efficiency and accuracy of the remedial actions and produce efficient and effective methods of maintaining stable and consistent operations of industrial devices of the industrial automation system 10.

The present disclosure is generally directed to industrial automation systems that implement container technologies. A container orchestration system may determine to deploy the one or more containers based on a trigger event, such as in response to a detected anomaly and/or an indication of a potential (e.g., imminent) anomaly, each of which, for example, may be associated with detected data values outside of specified threshold values (e.g., threshold value ranges). The container orchestration system may additionally deploy one or more containers to gather additional data associated with the detected anomaly. In particular, the container orchestrations system may deploy one or more data gathering containers to devices identified as having additional data associated with the anomaly, in response to the detected anomaly and/or the indication of the potential anomaly.

In some cases, the additional data may be gathered from devices associated with a same hierarchical level as the device containing the anomaly data. Additionally or alternatively, in some embodiments, the additional data may be gathered from devices of a lower hierarchical level as the device containing the anomaly data. In each of these examples, the container orchestration system may determine to deploy a container based on a trigger event and may determine specified start and/or end conditions associated with the container. These determinations may be made based on a schedule, based on an ongoing or expected computing resource use, based on a type of the device that the container is being deployed to, or the like. The container orchestration system may then receive the additional data and contextualize the anomaly data using additional data to produce a data pattern associated with the anomaly. The container orchestration system may then use the data pattern to identify other devices that may contain a similar data pattern (e.g., have similar contextualized data).

After identifying a similar contextualized data pattern and/or a device that may contain a similar contextualized data pattern, the container orchestration system may deploy (e.g., instruct the another container orchestration system to deploy) one or more data analysis containers to the device associated with the similar contextualized data pattern to identify an anomaly (e.g., anomaly type) and/or identify a remedial action associated with the anomaly. Furthermore, the container orchestration system may receive the indication of the identified anomaly and/or identified remedial action and deploy additional one or more containers or transmit control instructions to appropriate devices to implement the remedial action associated with the anomaly. Thus, the container orchestration system may deploy one or more containers to automatically gather and contextualize data associated with an anomaly, identify the anomaly and/or remedial action based on the contextualized data, and implement corrective actions associated with detected anomalies, to rapidly and efficiently respond to the detected anomalies and assist in maintaining stable and consistent operations of the industrial devices of the industrial automation system. Use of containers to generate data patterns to identify anomalies and/or appropriate remedial actions may be more efficient may result in more accurate and efficient corrective operations being made to the industrial automation system. Furthermore, by deploying non-perpetual containers that terminate based on time or data acquisition parameters, computing resources may be deployed more efficiently in the industrial automation system as computing resources may not be tied up in otherwise inactive or unused data acquisition operations. Other benefits are described and/or suggested herein. Accordingly, use of the disclosed techniques may improve product quality, process quality, and efficiency within the industrial automation system.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system comprising:
a plurality of industrial devices configured to perform one or more operations within an industrial automation system having a plurality of hierarchical levels, wherein each device of the plurality of industrial devices comprises a compute surface configured to perform one or more software tasks; and
a system of processors configured to:
receive trigger event data from at least one device of the plurality of industrial devices, wherein the at least one device corresponds to a first hierarchical level of the plurality of hierarchical levels;
identify a target device of the plurality of industrial devices based on the trigger event data and the plurality of hierarchical levels, wherein the target device is associated with additional data associated with the trigger event data and corresponds to a second hierarchical level of the plurality of hierarchical levels;
deploy a container to the target device, wherein the container is configured to cause a target compute surface of the target device to acquire the additional data;
generate a data pattern based on the trigger event data and the additional data;
determine a remedial action associated with the trigger event data based on the data pattern; and
instruct at least one device of the plurality of industrial devices to implement the remedial action.

2. The system of claim 1, wherein the trigger event data corresponds to data associated with the at least one device being outside of a threshold range of data values.

3. The system of claim 1, wherein the target device is located on a different hierarchical level of the plurality of hierarchical levels as compared to the at least one device.

4. The system of claim 1, wherein the system of processors is configured to:
identify an additional target device based on the data pattern and the plurality of hierarchical levels, wherein the additional target device comprises additional data patterns associated with the data pattern; and
deploy an additional container to the additional target device, wherein the additional container is configured to cause an additional compute surface to analyze the additional data patterns based on the data pattern.

5. The system of claim 4, wherein the additional target device is located on a different hierarchical level of the plurality of hierarchical levels as compared to the target device.

6. The system of claim 4, wherein the system of processors is configured to:
determine the remedial action based on a correlation of the data pattern to at least one data pattern of the additional data patterns, wherein the correlation is associated with the at least one data pattern comprising a threshold amount of matching data corresponding to data of the data pattern.

7. The system of claim 1, wherein the system of processors is configured to:
query a remote database based on the data pattern; and
receive an indication of the remedial action based on a correlation of the data pattern with at least one additional data pattern stored in the remote database.

8. The system of claim 1, wherein the system of processors is configured to:
identify an additional target device based on the remedial action; and
deploy an additional container to the additional target device, wherein the additional container is configured to implement the remedial action via the additional target device.

9. A method, comprising:
receiving, via a system of processors, trigger event data from at least one device of a plurality of industrial devices configured to perform one or more operations within an industrial automation system having a plurality of hierarchical levels, wherein each device of the plurality of industrial devices comprises a compute surface configured to perform one or more software tasks, and wherein the at least one device corresponds to a first hierarchical level of the plurality of hierarchical levels;

identifying, via the system of processors, a target device of the plurality of industrial devices based on the trigger event data and the plurality of hierarchical levels, wherein the target device is associated with additional data associated with the trigger event data and corresponds to a second hierarchical level of the plurality of hierarchical levels;

deploying, via the system of processors, a container to the target device, wherein the container is configured to cause a target compute surface of the target device to acquire the additional data;

generating, via the system of processors, a data pattern based on the trigger event data and the additional data;

determining, via the system of processors, a remedial action associated with the trigger event data based on the data pattern; and instructing, via the system of processors, at least one device of the plurality of industrial devices to implement the remedial action.

10. The method of claim 9, wherein the trigger event data corresponds to data associated with the at least one device being outside of a threshold range of data values.

11. The method of claim 9, wherein the target device is located on a different hierarchical level of the plurality of hierarchical levels as compared to the at least one device.

12. The method of claim 9, further comprising:
identifying, via the system of processors, an additional target device based on the data pattern and the plurality of hierarchical levels, wherein the additional target device comprises additional data patterns associated with the data pattern; and
deploying, via the system of processors, an additional container to the additional target device, wherein the additional container is configured to cause an additional compute surface to analyze the additional data patterns based on the data pattern.

13. The method of claim 12, wherein the additional target device is located on a different hierarchical level of the plurality of hierarchical levels as compared to the target device.

14. The method of claim 12, further comprising determining the remedial action based on a correlation of the data pattern to at least one data pattern of the additional data patterns, wherein the correlation is associated with the at least one data pattern comprising a threshold amount of matching data corresponding to data of the data pattern.

15. The method of claim 9, further comprising:
querying, via the system of processors, a remote database based on the data pattern; and
receiving, via the system of processors, an indication of the remedial action based on a correlation of the data pattern with at least one additional data pattern stored in the remote database.

16. The method of claim 9, further comprising:
identifying, via the system of processors, an additional target device based on the remedial action; and
deploying, via the system of processors, an additional container to the additional target device, wherein the additional container is configured to implement the remedial action via the additional target device.

17. A non-transitory, computer-readable medium storing instructions that, when executed by a system of processors, cause the system of processors to perform operations comprising:
receiving trigger event data from at least one device of a plurality of industrial devices configured to perform one or more operations within an industrial automation system having a plurality of hierarchical levels, wherein each device of the plurality of industrial devices comprises a compute surface configured to perform one or more software tasks, and wherein the at least one device corresponds to a first hierarchical level of the plurality of hierarchical levels;
identifying a target device of the plurality of industrial devices based on the trigger event data and the plurality of hierarchical levels, wherein the target device is associated with additional data associated with the trigger event data and corresponds to a second hierarchical level of the plurality of hierarchical levels;
deploying a container to the target device, wherein the container is configured to cause a target compute surface of the target device to acquire the additional data;
generating a data pattern based on the trigger event data and the additional data;
determining a remedial action associated with the trigger event data based on the data pattern; and
instructing at least one device of the plurality of industrial devices to implement the remedial action.

18. The computer-readable medium of claim 17, wherein the instructions cause the system of processors to perform operations comprising:
identifying an additional target device based on the data pattern and the plurality of hierarchical levels, wherein the additional target device comprises additional data patterns associated with the data pattern; and
deploying an additional container to the additional target device, wherein the additional container is configured to cause an additional compute surface to analyze the additional data patterns based on the data pattern.

19. The computer-readable medium of claim 18, wherein the instructions cause the system of processors to perform operations comprising:
determining the remedial action based on a correlation of the data pattern to at least one data pattern of the additional data patterns, wherein the correlation is associated with the at least one data pattern comprising a threshold amount of matching data corresponding to data of the data pattern;
identifying an additional target device based on the remedial action; and
deploying an additional container to the additional target device, wherein the additional container is configured to implement the remedial action via the additional target device.

20. The computer-readable medium of claim 19, wherein the target device is located on a different hierarchical level of the plurality of hierarchical levels as compared to the at least one device; and wherein the additional target device is located on a different hierarchical level of the plurality of hierarchical levels as compared to the target device, the at least one device, or both.

* * * * *